(12) United States Patent
Kumaido et al.

(10) Patent No.: US 7,363,136 B2
(45) Date of Patent: Apr. 22, 2008

(54) CONTROLLER OF ELECTRIC POWER STEERING APPARATUS

(75) Inventors: Kazuhiro Kumaido, Maebashi (JP); Yuho Aoki, Maebashi (JP)

(73) Assignee: NSK Ltd., Tokyo (JP)

( * ) Notice: Subject to any disclaimer, the term of this patent is extended or adjusted under 35 U.S.C. 154(b) by 117 days.

(21) Appl. No.: 11/449,604

(22) Filed: Jun. 9, 2006

(65) Prior Publication Data

US 2006/0282565 A1 Dec. 14, 2006

(30) Foreign Application Priority Data

Jun. 10, 2005 (JP) ............................. 2005-170891

(51) Int. Cl.
*B62D 5/04* (2006.01)
(52) U.S. Cl. ..................... 701/43; 701/41; 180/443; 180/446
(58) Field of Classification Search ............ 701/41–43; 180/412, 413, 422, 443, 446
See application file for complete search history.

(56) References Cited

U.S. PATENT DOCUMENTS

| 4,277,772 | A | 7/1981 | Kastura et al. | |
| 4,497,057 | A | 1/1985 | Kato et al. | |
| 5,265,468 | A | 11/1993 | Holst et al. | |
| 5,927,430 | A * | 7/1999 | Mukai et al. | 180/446 |
| 2003/0023405 | A1 | 1/2003 | Loehr et al. | |
| 2004/0182640 | A1 | 9/2004 | Katou et al. | |
| 2007/0000717 | A1* | 1/2007 | Kumaido et al. | 180/446 |
| 2007/0146169 | A1* | 6/2007 | Otsuka et al. | 341/15 |

FOREIGN PATENT DOCUMENTS

| JP | 2511174 B2 | 4/1996 |
| JP | 9-20261 A | 1/1997 |
| JP | 11-245853 A | 9/1999 |
| JP | 2000-337977 A | 12/2000 |
| JP | 2001-260953 A | 9/2001 |
| JP | 2005-41273 A | 2/2005 |
| JP | 3706084 B2 | 8/2005 |

OTHER PUBLICATIONS

European Search Report dated Oct. 16, 2006 (five (5) pages).

* cited by examiner

*Primary Examiner*—Gary Chin
(74) *Attorney, Agent, or Firm*—Crowell & Moring LLP

(57) ABSTRACT

An initial abnormality analysis data is reliably retained by a controller of an electric power steering apparatus. The controller of the electric power steering apparatus is constituted by comprising abnormality detection device for detecting the abnormality of a steering assist control mechanism comprising an electric motor giving a steering assist force to a steering system and abnormality data storage device for storing abnormality analysis data in storage device when the abnormality of the steering assist control mechanism is detected by this abnormality detection device, wherein the storage device comprises a plurality of overwrite prohibition storage areas for prohibiting rig the overwrite of the abnormality analysis data and a plurality of overwrite allowable storage areas for overwriting and storing the abnormality analysis data, and wherein the abnormality data storage device stores the abnormality of the steering assist control mechanism detected by the abnormality detection device in the overwrite prohibition storage area when the abnormality is a first abnormality analysis data, and stores the abnormality in the overwrite allowable storage area when the abnormality is the abnormality analysis data subsequent to the second time.

18 Claims, 12 Drawing Sheets

F I G. 12
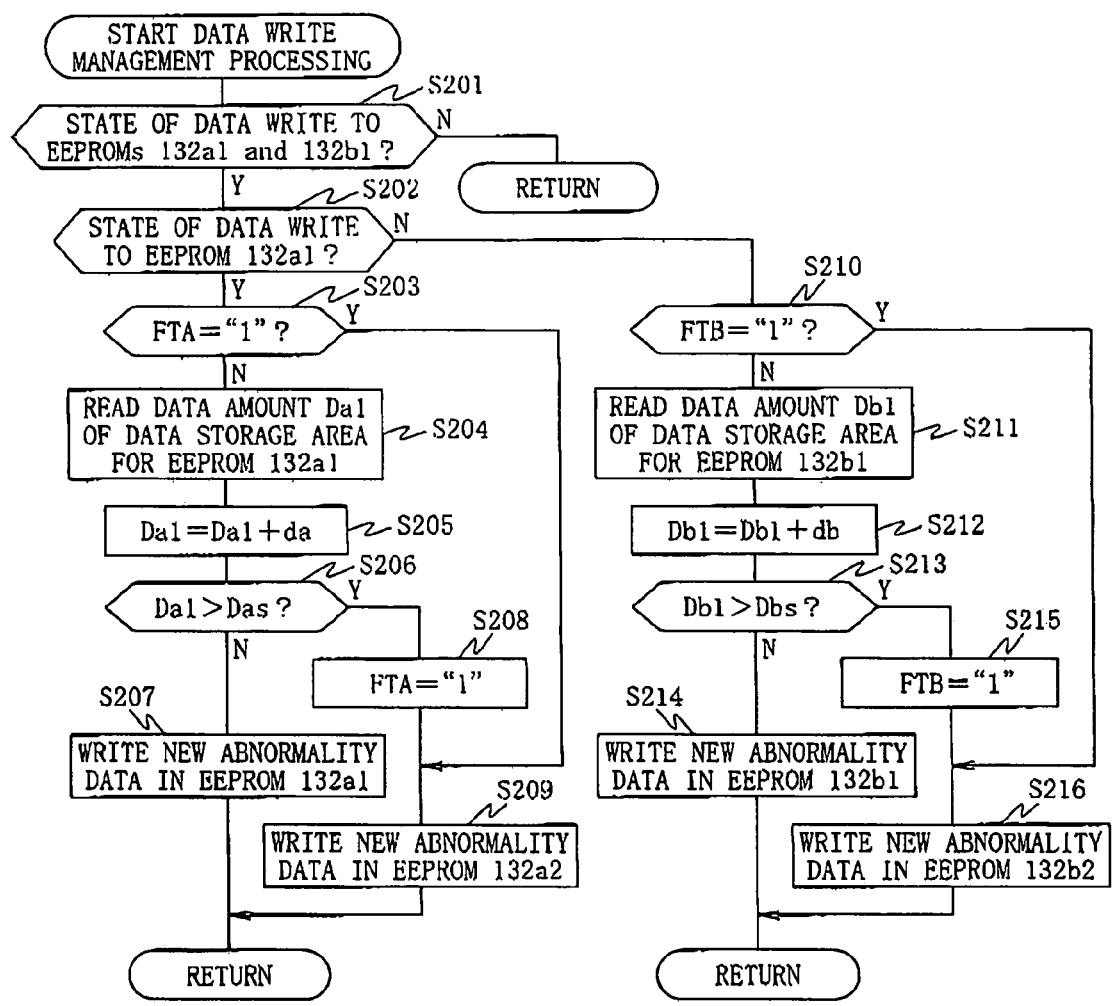

CONTROLLER OF ELECTRIC POWER STEERING APPARATUS

BACKGROUND OF THE INVENTION

1. Field of the Invention

The present invention relates to controller of an electric power steering apparatus comprising a steering assist control mechanism having an electric motor giving a steering assist force to a steering system, abnormality detection means for detecting an abnormality of this steering assist control mechanism, and abnormality data storage means for storing the abnormality analysis data in the storage means when the abnormality of the steering assist control mechanism is detected by this abnormality detection means.

2. Description of the Prior Art

In general, as a controller of the conventional electric power steering apparatus, for example, there has been known an electric power steering torque sensor, which is constituted by data detection means for detecting, for example, data usable for failure analysis of a torque sensor and temporary storage means for temporarily storing data detected by the data detection means, wherein data when a steering assist force command from among data stored in the temporary storage means exceeds a rated value, that is, data only when a handle operation by a driver is actually performed is written in a backup memory, thereby to exclude unnecessary data when analyzing a failure, and useful data only is retained so as to save a capacity of the backup memory, and further, the backup memory is constituted by an overwrite memory and an archival nonvolatile memory, and in case the size of data stored in the temporary storage means exceeds a setting range, that is, if and only when there is a high possibility of some abnormality being generated, data is additionally retained in the archival nonvolatile memory (for example, see JP2000-337977A).

However, in the conventional example disclosed in the aforementioned Patent Document 1, though analysis data is stored in the archival nonvolatile memory if and only when there is a high possibility of some kind of abnormality being generated, in case the data exceeds a retainable number of pieces of the archival nonvolatile memory, an overwrite is made in the archival nonvolatile memory, and this causes an unsolved problem of initial analysis data being erased.

That is, in case a user makes a request for repair to a dealer or a repair plant after finding out the failure of a torque sensor, when the abnormality exceeds a retainable number of times of the archival memory including the time during the repairing operation, the initial analysis data is overwritten so that the initial abnormality data necessary for analysis is lost to cause an unsolved problem, thereby becoming an obstacle to the abnormality analysis.

Hence, the present invention has been carried out aiming at the unsolved problem of the foregoing conventional example, and an object of the invention is to provide a controller of an electric power steering apparatus, which can reliably retain initial abnormality analysis data necessary for failure analysis.

SUMMARY OF THE INVENTION

In order to achieve the object, the controller of the electric power steering apparatus according to claim 1 is a controller of an electric power steering apparatus characterized by comprising: a steering assist control mechanism comprising an electric motor giving a steering assist force to a steering system; abnormality detection means for detecting an abnormality of the steering assist control mechanism; and abnormality data storage means for storing the abnormality analysis data in storage means when the abnormality of the steering assist control mechanism is detected by the abnormality detection means, wherein the storage means comprises: an overwrite prohibition storage area for prohibiting an overwrite of the abnormality analysis data and an overwrite allowable storage area for overwriting and storing the abnormality analysis data, and wherein, when the abnormality of the steering assist control mechanism detected by the abnormality detection means is initial abnormality analysis data, abnormality data storage means stores the abnormality in the overwrite prohibition storage area, and when the abnormality is the abnormality analysis data subsequent to the initial abnormality analysis data, the abnormality data storage means stores the abnormality in the overwrite allowable storage area.

According to the invention according to claim 1, when the abnormality of the steering assist control mechanism is detected by the abnormality detection means, the abnormality data storage means determines whether or not the abnormality is initial abnormality analysis data of the steering assist control mechanism, and when the abnormality is the initial abnormality analysis data, the abnormality is stored in the overwrite prohibition storage area of the storage means, and when the abnormality is not the initial abnormality analysis data, the abnormality is stored in the overwrite allowable storage area of the storage means, and therefore, the initial abnormality analysis data can be reliably retained in the overwrite prohibition storage area, and the most recent initial abnormality analysis data can be stored in the overwrite allowable storage area, and by reading the initial abnormality analysis data and the most recent abnormality analysis data stored in the overwrite prohibition storage area and the overwrite allowable storage area, the advantage of being able to perform an accurate abnormality analysis can be obtained.

Further, the controller of the electric power steering apparatus according to claim 2 in the invention according to claim 1 is characterized in that the storage means is constituted by an electrically erasable read-only memory.

According to the invention according to claim 2, since the storage means is constituted by an electrically erasable read-only memory, at the point of time when the abnormality analysis is terminated, the initial abnormality analysis data and the most recent abnormality analysis data stored in the overwrite prohibition storage area and the overwrite allowable storage area are totally erased, and this provides the advantage of being able to store abnormality analysis data again.

Further, the controller of the electric power steering apparatus according to claim 3 in the invention according to claim 1 or 2 is characterized in that the abnormality data storage means is constituted to have an initial data discriminating flag set when an initial abnormality analysis data is stored in the storage means, and store the abnormality analysis data as the initial abnormality analysis data in the overwrite prohibition storage area in case the abnormality analysis data is inputted when the initial data discriminating flag is reset, and store the initial abnormality analysis data in the overwrite allowable storage area as the abnormality analysis data subsequent to the initial abnormality analysis data when the initial data discriminating flag is set.

According to the invention according to claim 3, when the abnormality analysis data is inputted, it is determined whether or not the abnormality analysis data is the initial abnormality analysis data depending on whether or not the initial data discriminating flag is reset, and when the abnormality analysis data is the initial abnormality analysis data, the abnormality analysis data is stored in the overwrite prohibition storage area, and when the abnormality analysis data is a subsequent abnormality analysis data, the abnormality analysis data is stored in the overwrite allowable storage area, and this provides the advantage of being able to accurately store the initial abnormality analysis data in the overwrite prohibition storage area.

Furthermore, the controller of the electric power steering apparatus according to claim 4 in the invention according to claim 3 is characterized in that the abnormality data storage means comprises flag reset means for resetting the initial data discriminating flag when an analysis processing of the abnormality analysis data is performed.

According to the invention according to claim 4, when the analytic processing of the abnormality analysis data is performed, the initial data discriminating flag is reset by flag reset means, and this provides the advantage of being able to make the storage of new initial abnormality analysis data possible again after the analytic processing of the abnormality analysis data.

Further, the controller of the electric power steering apparatus according to claim 5 in the invention according to any one of claims 1 to 4 is characterized in that the storage means has a plurality of overwrite prohibition storage areas.

According to the invention according to claim 5, since the storage means has a plurality of overwrite prohibition storage areas, in case the abnormality analysis data initially stored is erroneously detected or the abnormality different from the abnormality initially generated is generated, these abnormalities can be stored individually in a plurality of overwrite prohibition storage areas, and in case multiple abnormalities are generated, it provides the advantage of being able to accurately perform abnormality analysis.

Further, the controller of the electric power steering apparatus according to claim 6 is characterized by comprising: a steering assist control mechanism comprising an electric motor giving a steering assist force to a steering system; initial abnormality detection means for detecting an abnormality at the operation starting time of the steering assist control mechanism; full-time abnormality detection means for detecting the abnormality in full time after the operation starting time of the steering control mechanism; and abnormality data storage means for storing the abnormality analysis data for analyzing the abnormality in the storage means when the abnormality is detected by the initial abnormality detection means and the full-time abnormality detection means, wherein the storage means comprises initial abnormality and full-time abnormality overwrite prohibition storage areas for prohibiting the overwrite of the abnormality analysis data and the initial abnormality and full-time abnormality overwrite allowable storage areas for overwriting and storing the abnormality analysis data individually corresponding to the initial abnormality detection means and the full-time abnormality detection means, and wherein the abnormality data storage means is constituted to store an abnormality of the steering assist control mechanism detected by the initial abnormality detection means in the initial abnormality overwrite prohibition storage area when the abnormality is an initial abnormality analysis data, and store the abnormality in the initial abnormality overwrite allowable storage area when the abnormality is the initial abnormality analysis data subsequent to the second time, and store the abnormality in the full-time abnormality overwrite prohibition storage area when the abnormality of the steering assist control mechanism detected by the full-time abnormality detection means is an initial abnormality analysis data, and store the abnormality in the full-time abnormality overwrite allowable storage area when the abnormality is the full-time abnormality analysis data subsequent to the second time.

According to the invention according to claim 6, the abnormality at the operation starting time of the steering assist control mechanism is detected by the initial abnormality detection means, and the abnormality after the operation starting time of the steering assist control mechanism is detected by the full-time abnormality detection means, and the abnormalities detected by these initial abnormality detection means and the full-time abnormality detection means can be stored individually in the initial abnormality overwrite prohibition storage area, the initial abnormality overwrite allowable storage area, the full-time abnormality overwrite prohibition storage area, and the full-time abnormality overwrite allowable area, and the abnormality analysis data at the abnormality detecting time by an initial diagnosis at the operation starting time of the steering assist control mechanism and the abnormality analysis data at the abnormality detecting time by a full-time diagnosis after the operation starting time can be individually stored, and this provides the advantage of being able to accurately perform the abnormality analysis at the abnormality generating time.

Furthermore, the controller of the electric power steering apparatus according to claim 7 in the invention according to any one of claims 1 to 6 is characterized in that the abnormality data storage means is constituted to retain the abnormality analysis data during a predetermined time before and after the abnormality detection in time sequence.

According to the invention according to claim 7, since the abnormality analysis data during a predetermined time before and after the abnormality is detected by the abnormality data storage means is retained in time sequence, this provides the advantage of being able to accurately determine a development leading to the abnormality and a state after that from time sequential data.

Further, the controller of the electric power steering apparatus according to claim 8 in the invention according to claim 7 is characterized in that the abnormality analysis data is constituted by time sequential data during the detection period composed of a first predetermined time leading to the generation of the abnormality and time sequential data during the confirmation period till the second predetermined time from the termination time of the detection period.

According to the invention according to claim 8, since the abnormality analysis data is constituted by time sequential data during the detection period in a first predetermined time leading to the generation of the abnormality as time sequential data and time sequential data during the confirmation period from the detection period to a second predetermined time, this provides the advantage of being able to reliably analyze data change in the course of detecting the abnormality.

Further, the controller of the electric power steering apparatus according to claim 9 in the invention according to claim 6 or 7 is characterized in that the initial abnormality detection means is constituted to perform any one or combination of the initial abnormality detection of torque detection means included in the steering assist control mechanism, the initial abnormality detection of the control means included in the steering assist control mechanism, the initial abnormality detection of current detection means included in the steering assist control mechanism, the initial abnormality detection of the electric motor included in the steering assist control mechanism, the initial abnormality detection of the power supply system, and the initial abnormality detection of the storage unit.

According to the invention according to claim 9, by the initial abnormality detection means as an initial abnormality detection mode, any one or a plurality of the initial abnormality detection of the torque detection means included in the steering assist control mechanism, the initial abnormality detection of the control means included in the steering assist control mechanism, the initial abnormality detection of current detection means included in the steering assist control mechanism, the initial abnormality detection of the electric motor included in the steering assist control mechanism, the initial abnormality detection of the power supply system, and the initial abnormality detection of the storage unit are performed, and this provides the advantages of being able to accurately detect the abnormality generated in the steering assist control mechanism at the operation starting time.

Further, the controller of the electric power steering apparatus according to claim 10 in the invention according to any one of claim 6 to 8 is characterized in that the full-time abnormality detection means is constituted to perform any one or combination of the full-time abnormality detection of torque detection means included in the steering assist control mechanism, the full-time abnormality detection of the control means included in the steering assist control mechanism, the full-time abnormality detection of current detection means included in the steering assist control mechanism, the full-time abnormality detection of the electric motor included in the steering assist control mechanism, the full-time abnormality detection of speed detection means included in the steering assist control mechanism, and the full-time abnormality detection of the power supply system.

According to the invention according to claim 10, by the full-time abnormality detection means as the full-time abnormality detection, the full-time abnormality detection means performs any one or a plurality of the full-time abnormality detection of torque detection means included in the steering assist control mechanism, the full-time abnormality detection of the control means included in the steering assist control mechanism, the full-time abnormality detection of current detection means included in the steering assist control mechanism, the full-time abnormality detection of the electric motor included in the steering assist control mechanism, the full-time abnormality detection of speed detection means included in the steering assist control mechanism, and the full-time abnormality detection of the power supply system, and this provide the advantage of being able to accurately detect the abnormality generated in the steering assist control mechanism after the operation starting time.

Further, the controller of the electric power steering apparatus according to claim 11 in the invention according to any one of claim 6 to 10 is characterized by comprising data amount managing means for managing the data amount initially stored in the initial abnormality overwrite prohibition storage area and the full-time abnormality overwrite prohibition storage area, and storage data adding means for additionally storing new abnormality analysis data in the initial abnormality overwrite prohibition storage area and the full-time abnormality overwrite prohibition storage area by determining whether or not the abnormality analysis data is storable and if storable based on the data amount managed by the data amount managing means when the abnormality analysis data is generated next.

According to the invention according to claim 11, the data amount of the abnormality analysis data stored in the initial and full-time overwrite prohibition storage areas is managed by data amount managing means, and when the data amount of the abnormality analysis data is few and the abnormality analysis data is generated next, in case this abnormality analysis data is storable in the overwrite prohibition area, new abnormality analysis data is additionally stored, and this provides the advantage of being able to make an effective use of the storage capacity of the initial and full-time overwrite prohibition storage areas.

Furthermore, the controller of the electric power steering apparatus according to claim 12 in the invention according to claim 11 is characterized in that the data managing means is constituted to store and manage the data amount stored in the initial abnormality overwrite prohibition storage area and the full-time abnormality overwrite prohibition storage area in a nonvolatile memory.

According to the invention according to claim 12, since the data amount managing means stores and manages the data amount stored in the initial abnormality and full-time abnormality overwrite prohibition storage areas in the nonvolatile memory, accurate data management can be performed without vanishing the data amount.

BRIEF DESCRIPTION OF THE DRAWINGS

FIG. 12 is a flowchart showing one example of the data write management processing procedure executed by the main MCU.

DESCRIPTION OF THE PREFERRED EMBODIMENTS

An embodiment of the present invention will be described with reference to the accompanying drawings.

Figure 1:
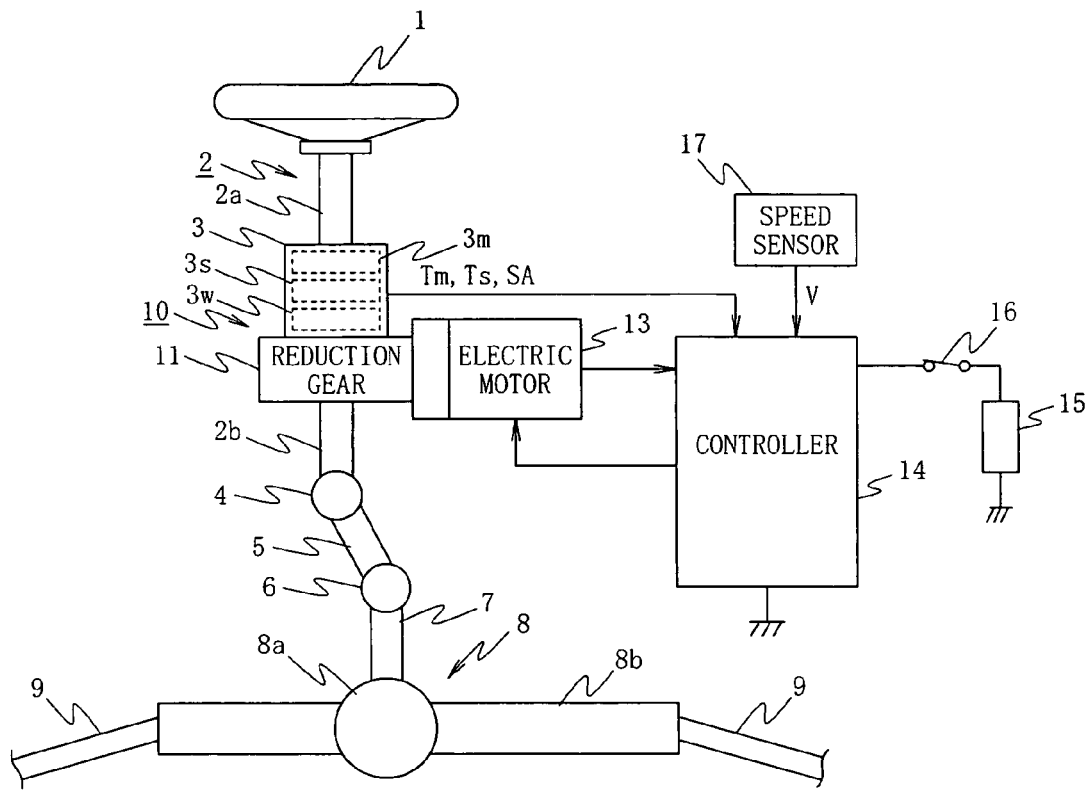
FIG. 1 is a schematic block diagram showing one embodiment of the present invention.

FIG. 1 is a schematic block diagram showing one embodiment of the present invention. In the Figure, reference numeral 1 denotes a steering wheel, and a steering force operated from a driver to this steering wheel 1 is transmitted to a steering shaft 2 having an input shaft 2a and an output shaft 2b. This steering shaft 2 has one end of the input shaft 2a coupled to the steering wheel 1 and the other end coupled to one end of the output shaft 2b through a steering torque sensor 3 as a steering torque detection means. Here, the steering torque sensor 3 is constituted by a main torque sensor 3m, a sub-torque sensor 3s, and a sensor voltage monitoring unit 3w which monitors whether or not a sensor voltage supplied to both of the torque sensors 3m and 3s is normal and, when the sensor voltage is abnormal, a voltage abnormality detection signal SA of, for example, theoretical value "1" is outputted.

The steering force transmitted to the output shaft 2b is transmitted to a lower shaft 5 through a universal joint 4, and is further transmitted to a pinion shaft 7 through a universal joint 6. The steering force transmitted to this pinion shaft 7 is transmitted to tie rods 9 through a steering gear 8, and allows an unillustrated steering wheel to be steered. Here, the steering gear 8 is constituted by a rack-and-pinion system which has a pinion 8a coupled to the pinion shaft 7 and a rack 8b engaged with this pinion 8a, and converts rotational motion transmitted to the pinion 8a into linear motion by the rack 8b.

The output shaft 2b of the steering shaft 2 is coupled with a steering assist mechanism 10 which transmits steering assist force to the output shaft 2b. This steering assist mechanism 10 comprises a reduction gear 11 coupled to the output shaft 2b and an electric motor 13 as a motor coupled to this reduction gear 11, the electric motor 13 generating a steering assist force.

Figure 2:
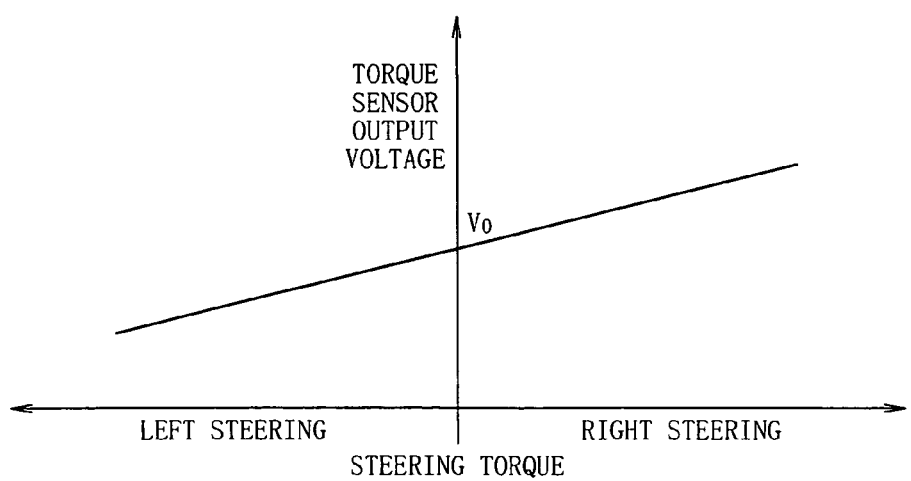
FIG. 2 is a characteristic line diagram of a torque detection signal detected by a steering torque sensor.

The steering torque sensor 3 is given to the steering wheel 1, and detects steering torque transmitted to the input shaft 2a, and for example, converts steering torque into torsion angular displacement of an unillustrated torsion bar interposed between the input shaft 2a and the output shaft 2b and detects this torsion angular displacement by a potentiometer. This torque sensor 3, as shown in FIG. 2, is constituted such that when the inputted steering torque is zero, the sensor 3 has a predetermined neutral voltage V0, and when taking a turn to the right from this state, the sensor 3 has an increased voltage from the neutral voltage V0 according to the increase of the steering torque, and when the steering torque takes a turn to the left from the zero state, the sensor 3 has a voltage reduced from the neutral voltage V0 according to the increase of the steering torque, thereby to output the torque detection value T.

Torque detection values Tm and Ts outputted from this torque sensor 3 are inputted to the controller 14. This controller 14 is provided with a power supply from a battery 15 through a key switch 16, and in addition to the torque detection values Tm and Ts, is inputted also with a speed detection value V detected by a speed sensor 17 and a driving current detection value IND flowing in the electric motor 13. The controller 14 calculates the steering assist command value IM*, which generates the torque detection value Tm to be inputted and the steering assist force according to the speed detection value V by the electric motor 13 and feeds back and controls driving current to be supplied to the electric motor 13 by the calculated steering assist command value IM* and the motor current detection value IMD.

Figure 3:
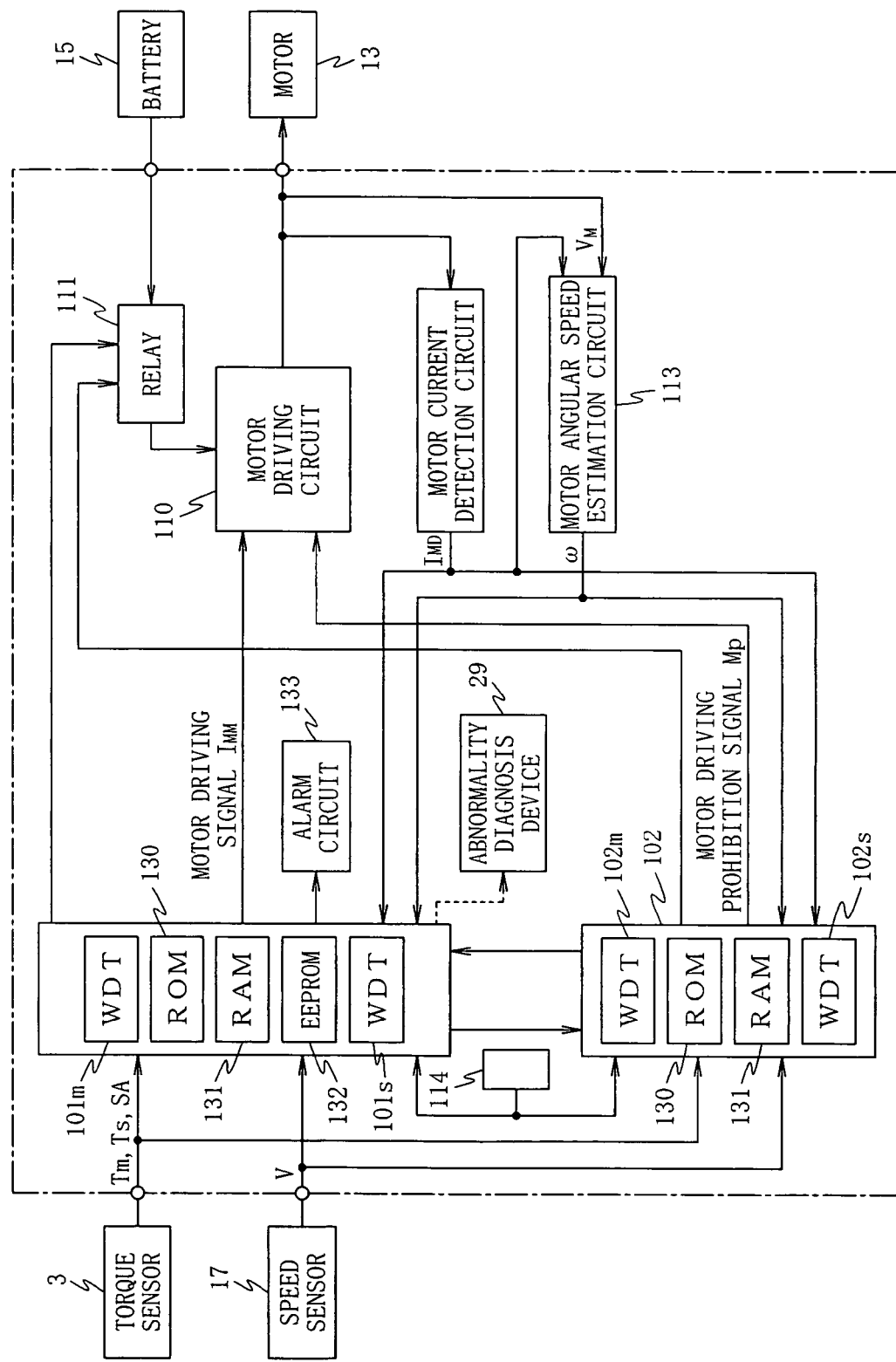
FIG. 3 is a block diagram showing a specific structure of a controller of FIG. 1.

The controller 14, as shown in FIG. 3, comprises a main and sub MCU (Micro Controller Unit) 101 and 102, which output a motor driving signal Ir and a motor direction signal Ds by performing a predetermined calculation based on the torque detection values Tm and Ts and the speed detection value V, a motor driving circuit 110 which drives the electric motor 13 based on the motor driving signal Ir and the motor direction signal Ds outputted from the main MCU 101, a relay 111 which is connected to the key switch 16 and controls the provision of the power supply to the motor driving circuit 110, a motor current detection circuit 112 for detecting the motor current IMD, a motor angular speed estimation circuit 113 for estimating a motor angular speed ω based on a motor current IMD and a motor terminal voltage VM supplied from the motor driving circuit 18 to the electric motor 13, and a temperature sensor 114 for detecting temperatures in the vicinity of the main MCU 101 and the sub MCU 102.

The main MCU 101 has a built-in self-monitoring watch dog timer (WDT) 101m for mutual monitoring and a built-in sub watch dog timer (WDT) 101s. The sub MCU 102 also has also a built-in self-monitoring watch dog timer (WDT) 102s for mutual monitoring and a built-in main watch dog timer (WDT) 102m. The sub MCU 102 determines that a main CPU 101 is abnormal due to runaway and the like when the main watch dog timer 102m stops because time is up, and outputs a motor drive prohibition signal Mp to the motor driving circuit 110 to stop the driving of the motor 13 and outputs an off signal to the relay 111.

Although the main MCU 101 and the sub MCU 102 concurrently generate the torque detection values Tm and Ts, the speed detection value V, the current detection value IMD, and the motor driving signals IMM and IMS based on the motor angular speed ω, the motor driving signal IMM only from the main MCU 101 is inputted to the motor driving circuit 110, and the motor driving signal IMS calculated at the sub MCU 102 is used for monitoring. Hence, in the sub MCU 102, the motor driving signal IMS calculated by itself and the motor driving signal IMM calculated by the main MCU 101 are compared, and when the deviation of both signals is within a predetermined range, it is determined that the main MCU 101 is normal, but when the deviation is outside the predetermined range, it is determined that the main MCU 101 is abnormal, so that the motor driving prohibition signal Mp is outputted to the motor driving circuit 110, and at the same time, the sub MCU 102 outputs an off signal to the relay 111.

Here, the main MCU 101, as shown in FIG. 3, is built-in with a ROM (read only memory) 130 storing a steering assist control processing program, an abnormality detection processing program, and the like to be executed by both of the MCUs and a RAM (random access memory) 131 storing detection data such as the torque detection value T, the motor current detection value IMD, the motor angular speed ω, and the like, data required in the process of the steering assist control processing and the abnormality detection processing to be executed by the MCU, and the processing result. At the same time, the main MCU 101 is built-in at least with an electrically erasable EEPROM 132 which stores abnormality analysis data at the abnormality detection time of the steering assist mechanism, and furthermore, is connected with an alarm device 133 for raising an alarm. Further, the sub MCU 102 is built-in at least with a ROM 130 storing the steering assist control processing program and the like, data required in the process of the steering assist control processing and the like to be executed by the MCU, and a RAM 131 storing the processing result.

Figure 4:
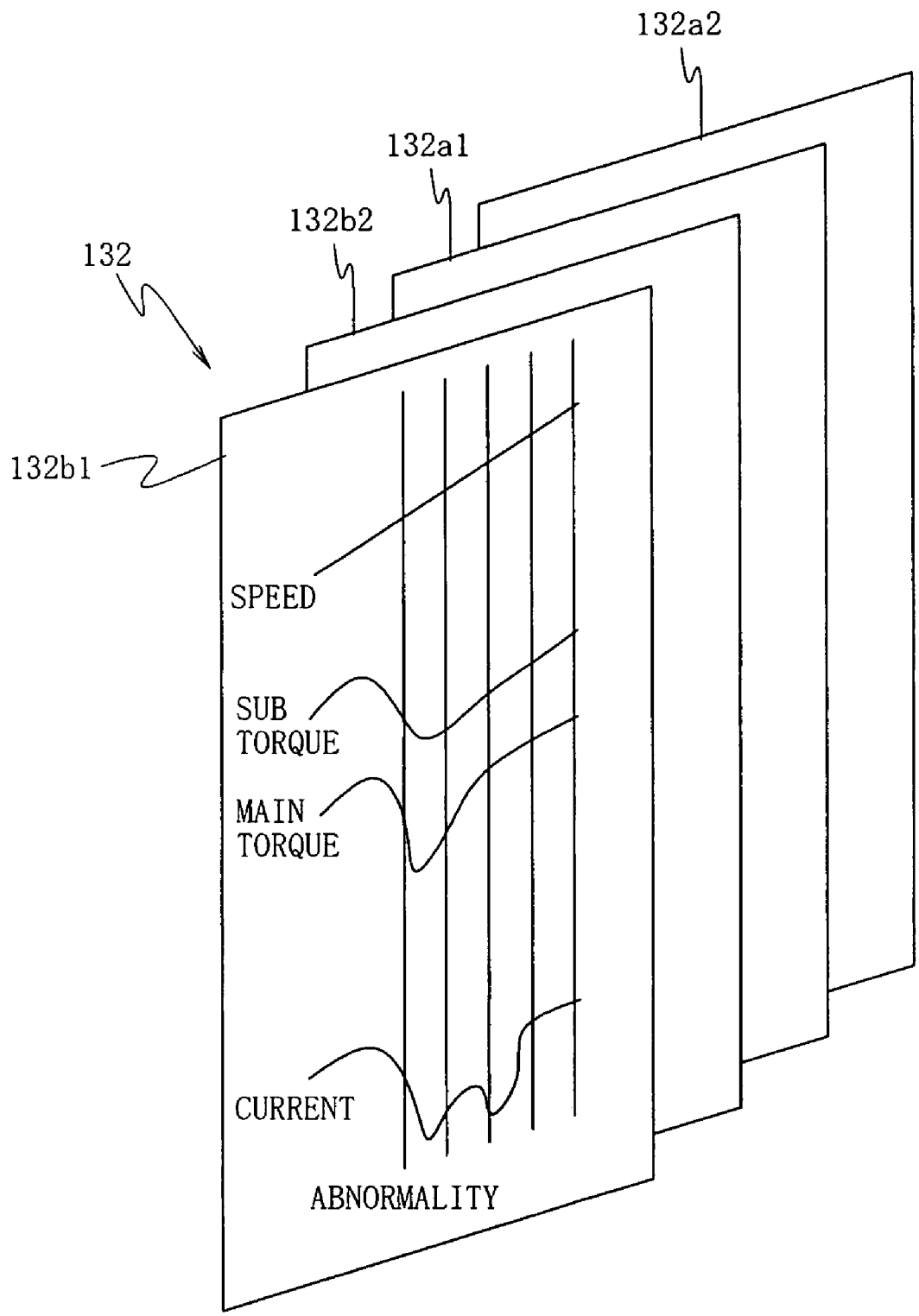
FIG. 4 is an explanatory drawing showing a structure of EEPROM.

Here, the EEPROM 132, as shown in FIG. 4, is constituted by overwrite prohibition EEPROMs 132a1 and 132b1 forming overwrite prohibition storage areas MA1 and MB1, which store the abnormality analysis data (the speed detection value V, the steering torque detection value T, and the motor current detection value IMD) generated at the beginning in the initial abnormality detection processing at the operation starting time of the steering assist controller and in the full-time abnormality detection processing after starting operation of the steering assist controller since starting the abnormality detection processing like the factory shipment time as the initial abnormality analysis data and the full-time abnormality analysis data, and overwrite allowable EEPROMs 132a2 and 132b2 forming overwrite allowable storage areas MA2 and MB2, which store the initial abnormality analysis data and the full-time abnormality analysis data subsequent to the second time.

Figure 5:
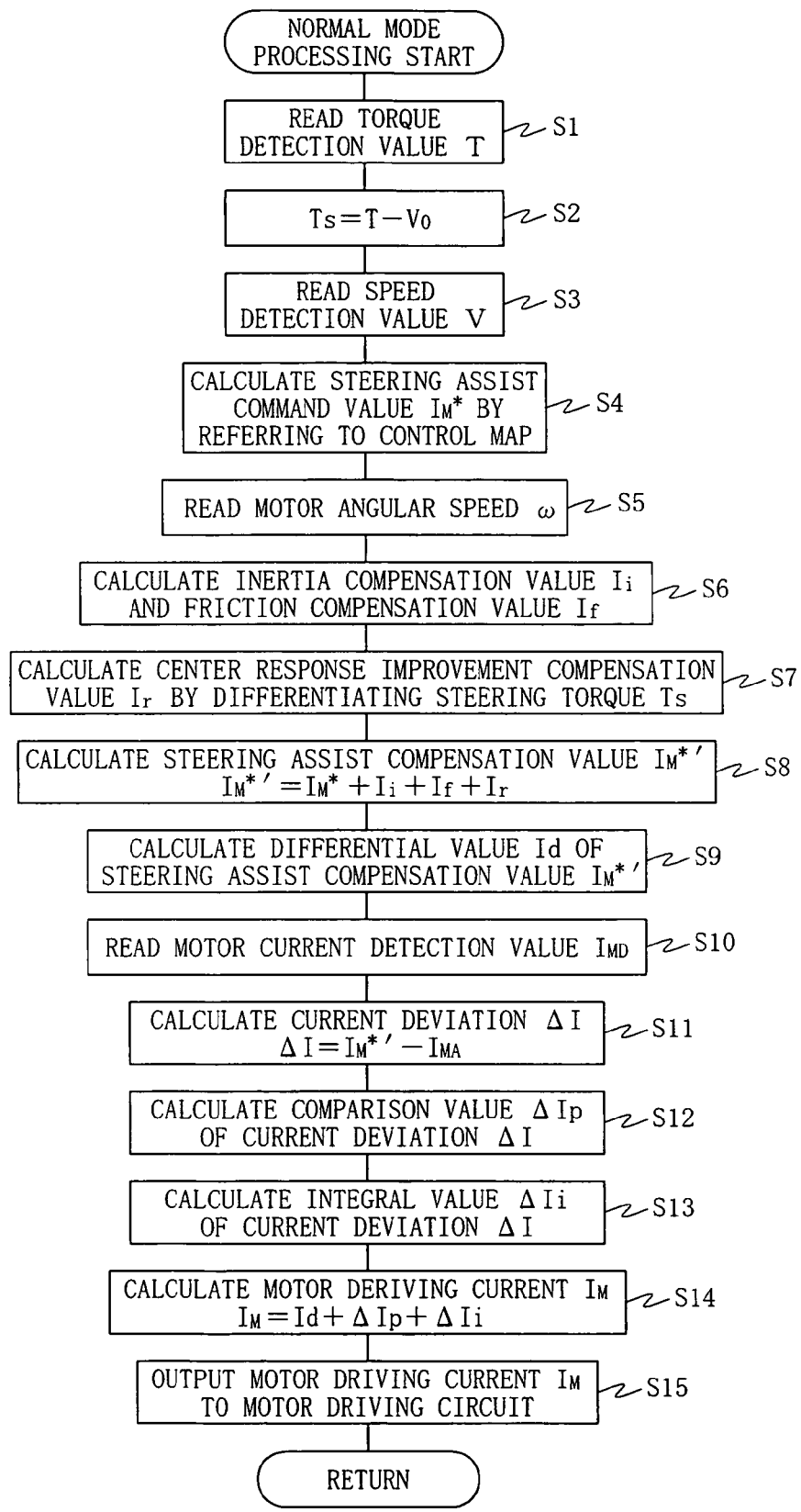
FIG. 5 is a flowchart showing one example of steering assist control processing procedures executed by main and sub MCUs.

Further, the steering assist control processing executed by the main MCU 101 and the sub MCU 102, as shown in FIG. 5, is as follows. First, at step S1, the torque detection value Tm detected by the main torque sensor 3m of the steering torque sensor 3 is read, and then, the processing proceeds to step S2, and calculates a steering torque Tr (=T−V0) by subtracting the neutral voltage V0 from the torque detection value Tm. Next, the processing proceeds to step S3, and reads the speed detection value V detected by the speed sensor 17, and then, proceeds to step S4, and calculates the steering assist command value IM* which becomes a motor current command value by referring to a steering assist command value calculation map shown in FIG. 6 based on the steering torque Tr and the speed detection value V.

Figure 6:
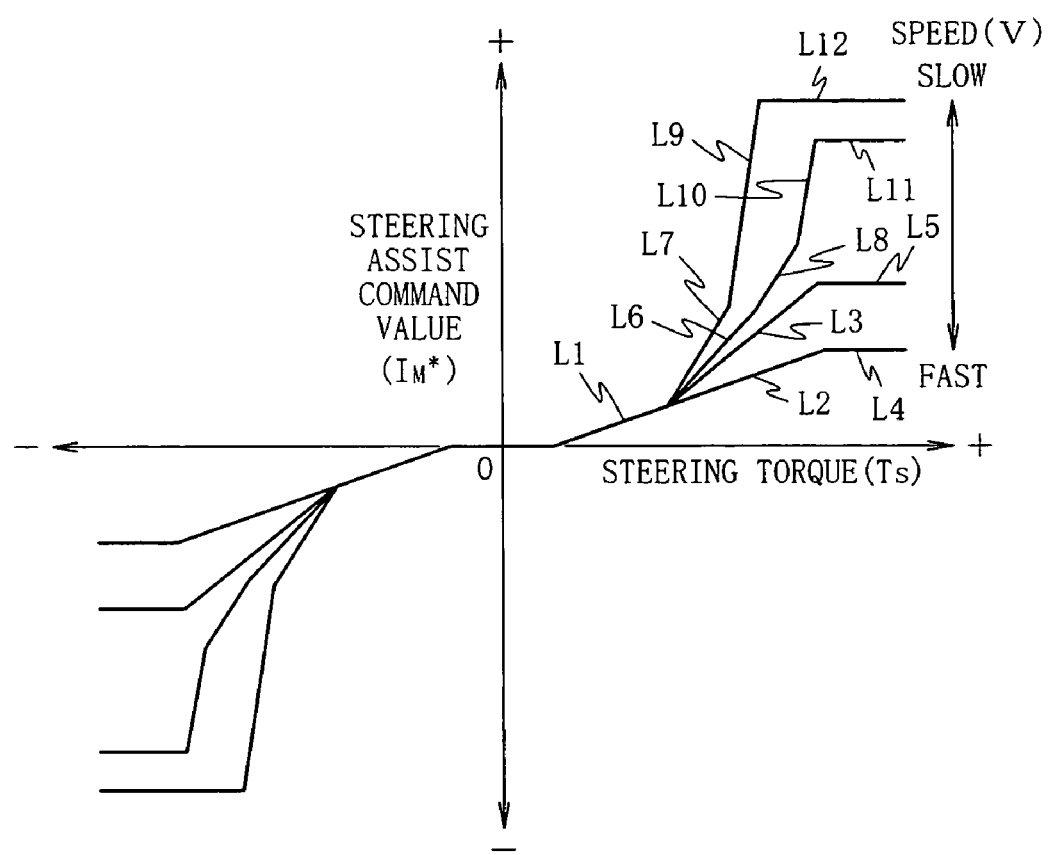
FIG. 6 is a characteristic line diagram showing a steering assist command value calculation map.

Here, the steering assist command value calculation map, as shown in FIG. 6, is constituted by a characteristic line diagram plotting the steering torque detection value T in the axis of abscissa and plotting the steering assist command value IM* in the axis of ordinate and taking the speed detection value V as a parameter. In the diagram, there are four characteristic lines formed, which are constituted by a straight line segment L1 extending in a relatively gentle inclination despite of the speed detection value V during the period when the steering torque Ts increases from "0" in the forward direction until reaching a first setting value Ts1, straight line segments L2 and L3 extending in relative gentle inclinations in a state in which the speed detection value V is relatively fast when the steering torque Ta increases up further than the first setting value Ts1, straight line segments L4 and L5 put in parallel with the axis of abscissa in the vicinity of the second setting value Ts in which the steering torque detection value Ts is larger than the first setting value Ts1, straight line segments L6 and L7 having relatively sharp inclinations in a state in which the speed detection value V is slow, straight line segments L8 and L9 having inclinations sharper than the straight line segments L6 and L7, straight line segment L10 having an inclination shaper than the straight line segment L8, and straight line segments L11 and L12 extending in parallel with the axis of abscissa from the trailing ends of the straight line segments L9 and L10. In case the steering torque Ts increases in a negative direction, the characteristic line diagram is similarly constituted to be formed by four characteristic lines which become symmetric with points by being sandwiched between the foregoing segments and the origin point.

Subsequently, the processing proceeds to step S5, and reads the motor angular speed ω presumed by a motor angular speed estimation circuit 20, and then, proceeds to step S6, and multiplies the motor angular speed ω by an inertial gain Ki, and excludes a torque to adjust motor inertia from the steering torque Tr, and calculates an inertia compensation value Ii (=Ki·ω) for inertia compensation control in order to obtain a steering sense with no inertial sense, and at the same time, multiplies the absolute value of the steering assist command value IM* by friction factor gain Kf, thereby to calculate a friction compensation value If (=Kf·IM*) for friction compensation control, so that the steering force is prevented from being affected by friction on a power transmission unit or the electric motor. Here, reference numeral of the friction compensation value If is decided based on reference numeral of the steering torque Tr and a steering direction signal to determine the oversteer and the understeer of the steering by using the steering torque Tr.

Subsequently, the processing proceeds to step S7 and performs a differential operation processing of the steering torque Tr, and calculates a center response improvement command value Ir to secure stability in assist characteristic blind sector and execute compensation of static friction. Then, the processing proceeds to step S8, and adds the calculated inertia compensation value Ii, the friction compensation value If, and the center response improvement command value Ir to the steering assist command value IM*, thereby to calculate a steering assist compensation command value IM*' (=IM*+Ii+If+Ir). Subsequently, the processing proceeds to step S9, and differentiates the steering assist compensation value IM*', and calculates a differential value Id for feed forward control.

Next, the processing proceeds to step S10, and reads a motor current detection value IMD, and then, proceeds to step S11, and subtracts the motor current detection value IMD from the steering assist compensation value IM*' to calculate a current deviation ΔI, and then, proceeds to step S12, and performs a comparison calculation processing of the current deviation ΔI to calculate a comparison value ΔIp for comparison compensation control, and then, proceeds to step S13, and performs an integration calculation processing of the current deviation ΔI to calculate an integrated value ΔIi for integration compensation control, and then, proceeds to step S14, and adds the differential value Id, the comparison value ΔIp, and the integrated value ΔIi, thereby to calculate a motor driving current IMJ (j=M and S) (=Id+ΔIp+ΔIi), and after that, proceeds to step S15.

In this step S15, the motor driving current IM calculated at the step S14 is outputted to the motor driving circuit 18, and then, the processing returns to the step S1.

Figure 7:
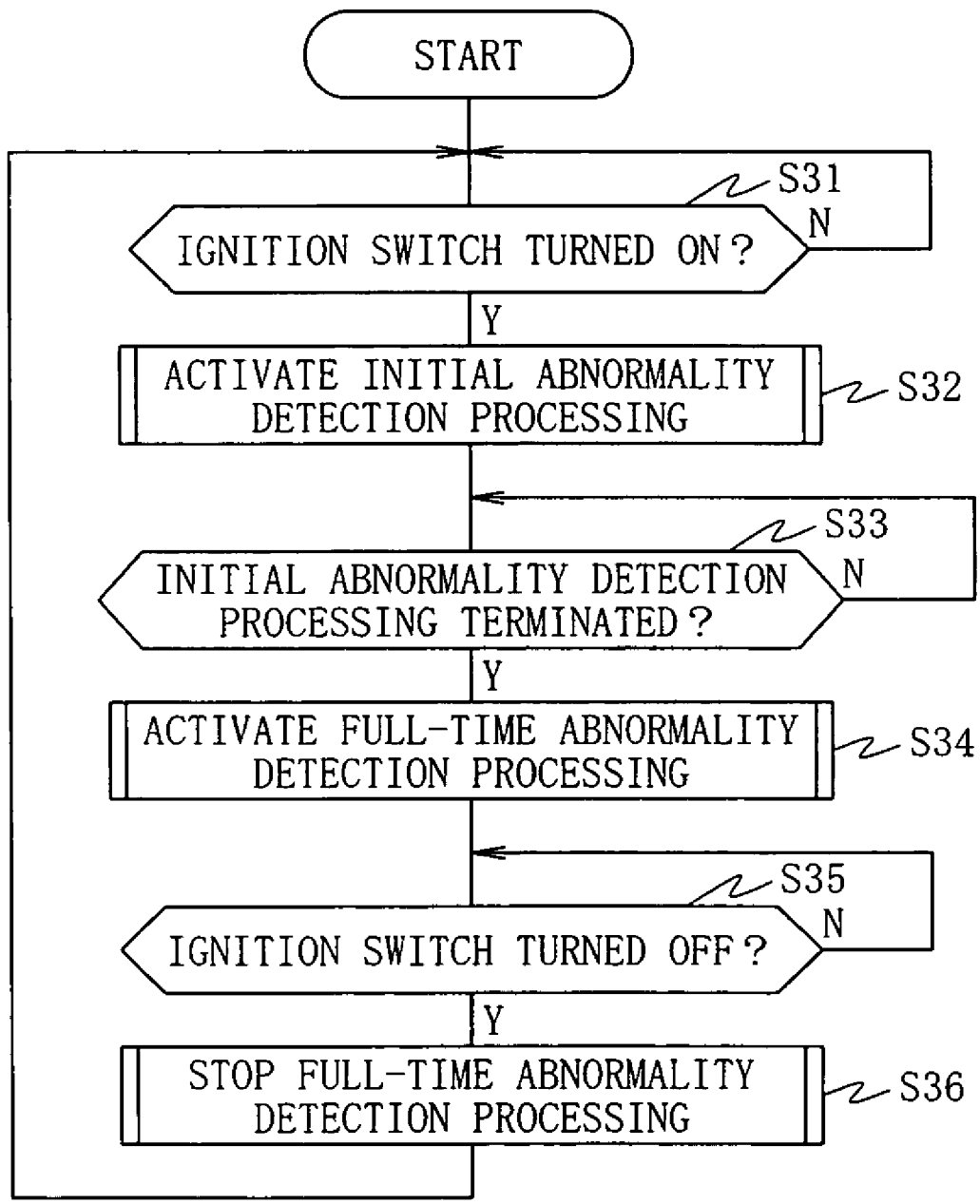
FIG. 7 is a flowchart showing one example of the abnormality detection processing procedure executed by the main MCU.

Further, in the main MCU 101, the abnormality detection processing for detecting the abnormality of the steering assist control mechanism shown in FIG. 7 is executed. This abnormality detection processing is executed and started, for example, when the key switch 16 is put into an on-state and the power supply is inputted to the controller 14. First, at step S31, the processing determines whether or not an ignition switch (not shown) is in an on-state, and when it is in an off-state, the processing determines that the steering assist controller is in a non-operating state, and waits until the ignition switch is put into an on-state, and when the ignition switch is in an on-state, proceeds to step S32, and after activating the initial abnormality detection processing shown in FIG. 8, proceeds to step S33.

In this step S33, the processing determines whether or not the initial abnormality detection processing is completed, and when the initial abnormality detection processing is not completed, waits until this processing is completed, and when the initial abnormality detection processing is completed, proceeds to step S34.

Figure 10:
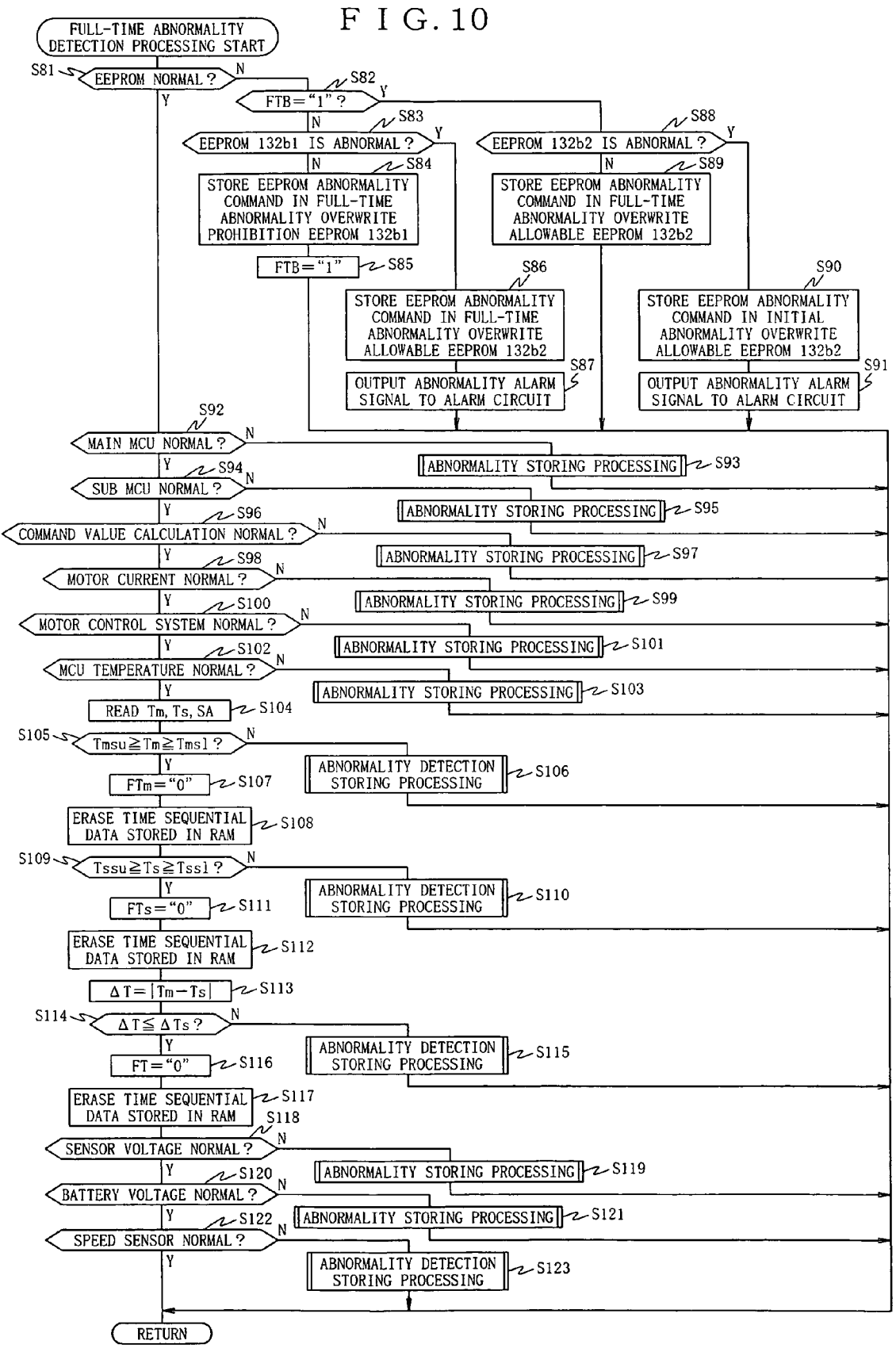
FIG. 10 is a flowchart showing one example of a full-time abnormality detection processing procedure.

In this step S34, after activating the full-time abnormality detection processing shown in FIG. 10, the processing proceeds to step S35, and determines whether or not the ignition switch is in an off-state, and when the ignition switch continues to be in an on-state, waits until this switch is put into an off-state, and when the ignition switch is put into an off-state, the processing proceeds to step S36, and after stopping the full-time abnormality detection processing, returns to the step S31.

Figure 8:
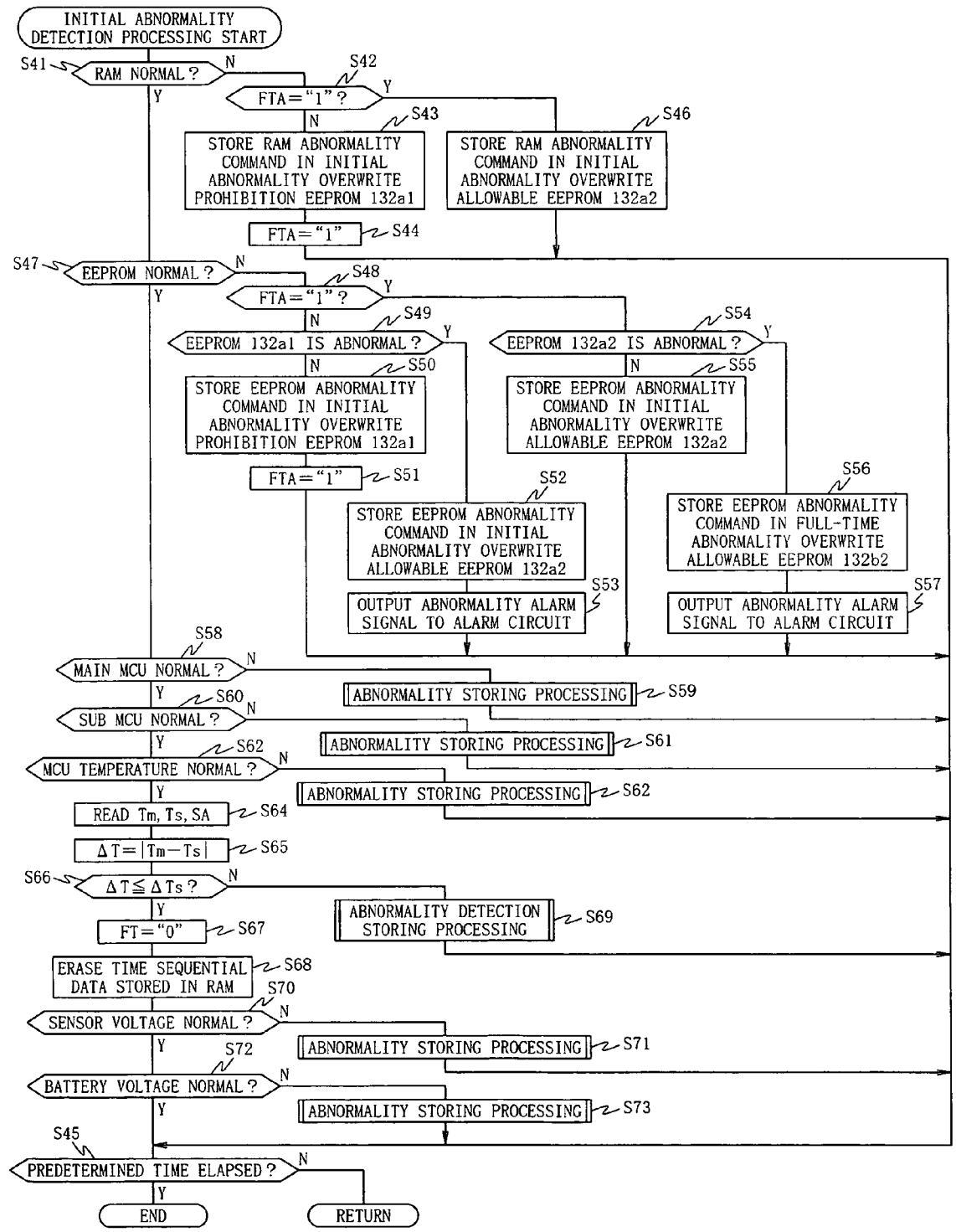
FIG. 8 is a flowchart showing one example of an initial abnormality detection processing procedure.

The initial abnormality detection processing is executed as a timer interrupt processing for a predetermined time, for example, for every 2 ms for a predetermined main program, and as shown in FIG. 8, first, at step S41, by determining whether or not both writing and reading of the RAM 131 are verified to match, the processing determines whether or not the RAM 131 is normal, and when the RAM 131 is abnormal, proceeds to step S42, and determines whether or not an initial data discriminating flag FTA stored in the normal ROM from among the EEPROMs 132a1 and 132b2 showing whether or not first initial abnormality analysis data is stored in the overwrite prohibition storage area MA1 on the overwrite prohibition EEPROM 132a1 is set in "1", which represents that the first initial abnormality analysis data is stored, and when the initial data discriminating flag FTA is reset to "0", the processing determines that the overwrite storage area MA1 is not stored with the first initial abnormality analysis data, and proceeds to step S43.

In this step S43, the processing writes a RAM abnormality command showing that the RAM 131 is abnormal in the overwrite prohibition storage area MA1, and then, proceeds to step S44, and sets the initial data discriminating flag FTA stored in the normal ROM from among the EEPROMs 132a1 and 132b2 in "1", and then, proceeds to the step S45, and determines whether or not the initial abnormality detection processing time set in advance has elapsed, and when the initial abnormality detection processing time has not yet elapsed, terminates the timer interrupt processing and returns to the predetermined main program, and when the initial abnormality detection processing time has elapsed, terminates the initial abnormality detection processing.

Further, when the determining result of step S42 shows that the initial data discriminating flag FTA is set in "1", the processing proceeds to step S46, and after storing the RAM abnormality command showing that the RAM 131 is abnormal in the overwrite allowable storage area MA2 formed on the overwrite allowable EEPROM 132a2, proceeds to the step S45.

On the other hand, when the determining result of the step S41 shows that the RAM 131 is normal, the processing proceeds to step S47, and performs a sum check of the EEPROMs 132a1 to 132b2, and by detecting whether or not they are not matched, determines whether or not the EEPROMs 132a1 to 132b2 are normal. When any of the EEPROMs 132a1 to 132b2 is abnormal, the processing proceeds to step S48, and determines whether or not the initial data discriminating flag FTA is set in "1", and if the flag is set to "0", the processing proceeds to step S49, and determines whether or not the abnormal EEPROM is the initial abnormality overwrite prohibition EEPROM 132a1, and when the initial abnormality overwrite prohibition EEPROM 132a1 is normal, the processing proceeds to step S50. After storing an EEPROM abnormality command showing that either of the abnormal EEPROMs 132a2, 132b1, and 132b2 is abnormal in the initial abnormality overwrite prohibition EEPROM 132a1, the processing proceeds to step S51, and sets the initial data discriminating flag FTA in "1", and after that, proceeds to the step S45, and when the initial abnormality overwrite prohibition EEPROM 132a1 is abnormal, proceeds to step S52, and after storing the EEPROM abnormality command showing that the initial abnormality overwrite prohibition EEPROM 132a1 is abnormal in the initial abnormality overwrite allowable EEPROM 132a2, proceeds to step S53, and outputs an abnormality alarm signal to an alarm circuit 133, and then, proceeds to the step S45.

Further, when the determining result of step S48 shows that the initial data discriminating flag FTA is set in "1", the processing proceeds to step S54, and determines whether or not the abnormal EEPROM is the initial abnormality overwrite allowable EEPROM 132a2, and when it is not the initial abnormality overwrite allowable EEPROM 132a2, proceeds to step S55, and after storing the EEPROM abnormality command showing the abnormal EEPROM in the initial abnormality overwrite allowable EEPROM 132a2, proceeds to the step S45, and when the initial abnormality overwrite allowable EEPROM 132a2 is abnormal, proceeds to step S56, and after storing the EEPROM abnormality command showing the abnormality of the initial abnormality overwrite allowable EEPROM 132 in the full-time abnormality overwrite allowable EEPROM 132b2, proceeds to S57, and outputs an abnormality alarm signal to the alarm circuit 133, and then, proceeds to the step S45.

On the other hand, when the determining result of step S47 shows that the EEPROMs 132a1 to 132b1 are normal, the processing proceeds to step S58, and determines whether or not the main MCU 101 is normal by determining whether or not the self-watch dog timer 101m has a clear command not generated within the predetermined time and stops working because time is up, and when the main MCU 101 is abnormal, proceeds to step S59, and performs the same processing as the processings of the steps S42 to S44 and S46, and executes an abnormality storage processing for storing a main MCU abnormality command showing that the main MCU 101 is abnormal in the initial overwrite prohibition EEPROM 132a1 or the initial overwrite allowable EEPROM 132a2 according to the state of the initial data discriminating flag FTA, and then, proceeds to the step S45.

Further, when the determining result of the step S58 shows that the main MCU 101 is normal, the processing proceeds to step S60, and by determining whether or not the sub watch dog timer 101s has no clear command generated within a predetermined time by the sub MCU 102 and stops working because time is up, determines whether or not the sub MCU 102 is normal, and when the sub MCU 102 is abnormal, proceeds to step S61, and performs the same processing as the processings of the steps S42 to S44 and S46, and executes an abnormality storage processing for storing a sub MCU abnormality command showing that the sub MCU 102 is abnormal in the initial overwrite prohibition EEPROM 132a1 or the initial overwrite allowable EEPROM 132a2 according to the state of the initial data discriminating flag FTA, and then, proceeds to the step S45.

Further, when the determining result of the step S60 shows that the sub MCU 102 is normal, the processing proceeds to step S62, and determines whether or not the temperature of the MCU vicinity detected by the temperature sensor 114 is normal within the range of normal temperature set in advance, and when the temperature of the MCU vicinity is outside of the range of the normal temperature, proceeds to step S63, and performs the same processing as the processings of the steps S42 to S44 and S46, and executes an abnormality storage processing for storing the detection temperature of the temperature sensor 114 in the initial overwrite prohibition EEPROM 132a1 or the initial overwrite allowable EEPROM 132a2 according to the state of the initial data discriminating flag FTA, and then, proceeds to the step S45.

Furthermore, when the determining result of the step S62 shows that the temperature of the MCU vicinity is within the range of the normal temperature and is normal, the processing proceeds to step S64, and after reading a torque detection values Tm and Ts of the main torque sensor 3m and the sub torque sensor 3s, and a voltage abnormality detection signal SA outputted from a sensor voltage monitoring unit 3w, proceeds to step S65.

In this step S65, based on the torque detection values Tm and Ts, calculation of the following formula (1) is performed, thereby to calculate a torque deviation ΔT.

$$\Delta T = |Tm - Ts| \quad (1)$$

Next, the processing proceeds to step S66, and determines whether or not the calculated torque deviation ΔT is in a normal state which is below the setting value ΔTs set in advance, and when ΔT≦ΔTs and is in a normal state, the processing proceeds to step S67, and resets a flag FT in course of the torque abnormality detection to be described later to "0", and then, proceeds to step S68, and after erasing the time sequential data stored in the RAM 131, proceeds to step S70 to be described later, and when ΔT>ΔTs and is in an abnormal state, proceeds to step S69, and after setting a set detection period and definite period and performing a torque sensor abnormality detection storing processing shown in FIG. 9 to detect the abnormality of the torque sensor 3, proceeds to the step S45.

In step S70, the processing reads a voltage abnormality detection signal SA inputted from a torque sensor power supply monitoring unit 3w, and determines whether or not this is normal being theoretical value "0", and when the voltage abnormality detection signal SA is theoretical value "1", proceeds to step S71, and performs the same processing as the processings of the steps S42 to S44 and S46, and after executing the abnormality storing processing for storing a torque sensor power supply abnormality command showing that the torque sensor power supply is abnormal in the initial overwrite prohibition EEPROM 132a1 or the initial overwrite allowable EEPROM 132a2 according to the state of the initial data discriminating flag FTA, proceeds to the step S45.

Further, when the determining result of the step S70 shows that the torque sensor power supply is normal, the processing proceeds to step S72, and determines whether or not a battery voltage Vb does not continue a state which is outside of the normal voltage range set in advance for a predetermined of time and is normal, and when the battery voltage Vb is outside of the normal voltage range, performs the same processing as the processings of the steps S42 to S44 and S46, and after executing the abnormality storing processing for storing the battery voltage Vb in the initial overwrite prohibition EEPROM 132a1 or the initial overwrite allowable EEPROM 132a2 according to the state of the initial data discriminating flag FTA, proceeds to the step S45.

Figure 9:
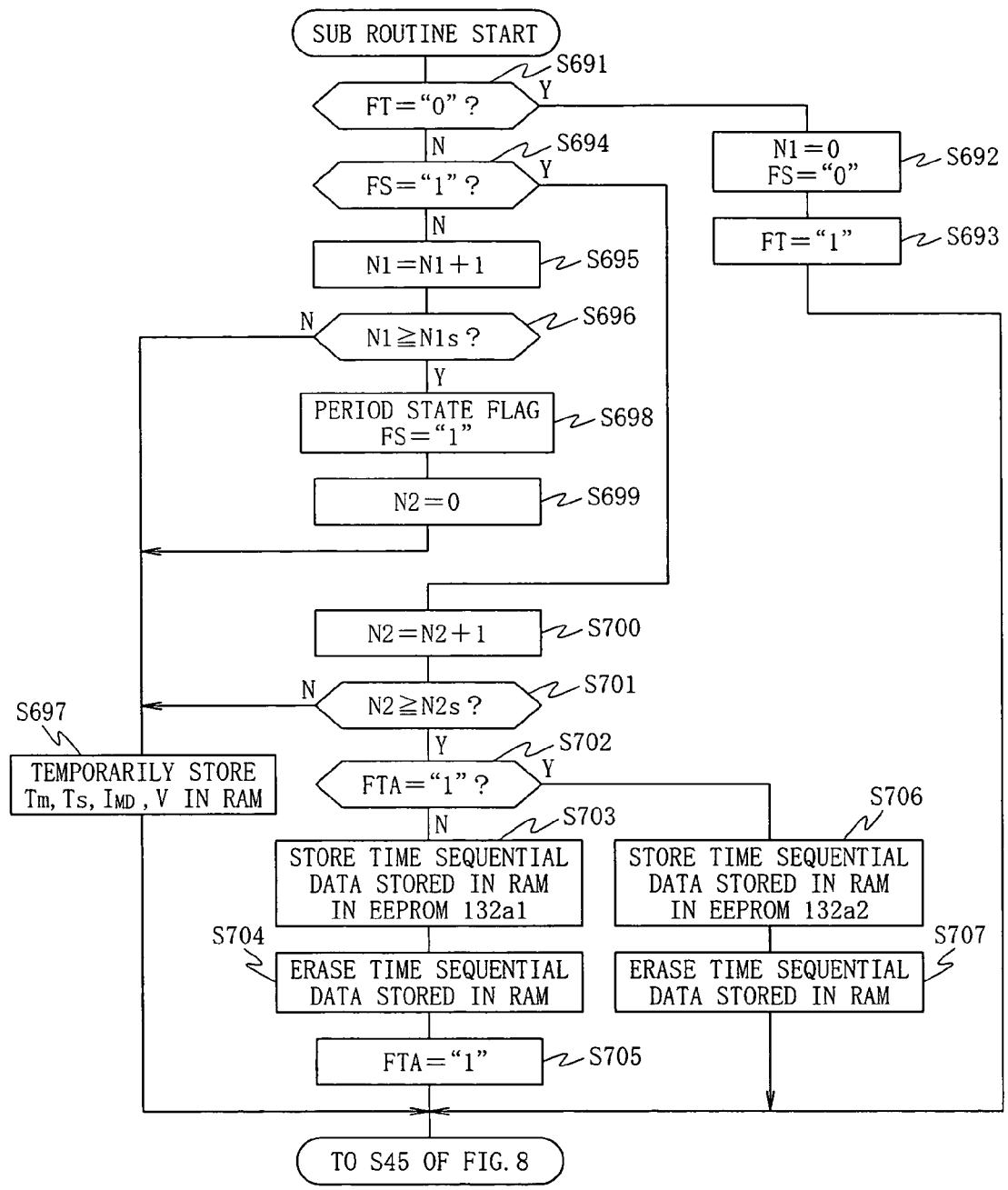
FIG. 9 is a flowchart showing one example of a torque sensor abnormality detection storing processing procedure.

The torque sensor abnormality detection storing processing of the step S69, as shown in FIG. 9, first, at step S691, determines whether or not the flag FT in course of the torque abnormality detection is reset to "0", and when this flag is reset to "0", proceeds to step S692, and clears a detection period continuation count value N1 to "0", and after resetting a period state flag FS showing that it is during the detection period or during the definite period to "0" which shows the detection period, proceeds to step S693, and after setting the flag FT in course of the torque abnormality detection in "1", proceeds to the step 45.

On the other hand, when the determining result of step S691 shows that the flag FT in course of the torque abnormality detection is set in "1", the processing proceeds to step S694, and determines whether or not the period state flag FS is set in "1", and when this flag is reset to "0", determines that it is detection period, and proceeds to step S695.

In this step S695, after incrementing "1" to the current detection period continuation count value N1 and calculating a new detection period continuation count value N1, the processing proceeds to step S696, and determines whether or not the detection period continuation count value N1 reaches a setting value N1s showing the termination of the detection period, and when N1<N1s, determines that N1 is during detection period, proceeds to step S697, and after temporarily storing the main torque detection value Tm, the sub torque detection value Ts, the motor current detection value IMD, and the speed detection value V in the RAM 131 as the time sequential data, proceeds to the step S45.

Further, when the determining result of step S696 is N1≧N1s, the processing reaches the terminating point of time of the detection period and detects that the torque sensor 3 is abnormal, and proceeds to step S698, and after setting a period state flag FS in "1", proceeds to step S699, and clears a definite period continuation count value N2 to "0", and after that, proceeds to the step S697.

On the other hand, when the determining result of the step S684 shows that the period state flag FS is set in "1", the processing proceeds to step S700, and after incrementing "1" to the current definite period continuation count value N2 and calculating a new definite period continuation count value N2, proceeds to step S701.

In this step S701, the processing determines whether or not the definite period continuation count value N2 calculated at step S700 has reached a setting value N2s showing the termination of the definite period, and when N2<N2s, determines that the definite period has not yet terminated, and proceeds to the step S697, and when N2≧N2s, determines that the definite period has terminated and the abnormality of the torque sensor 3 has become definite, and proceeds to step S702. Then, the processing determines whether or not the initial data discriminating flag FTA showing whether or not the first initial abnormality analysis data is stored in the overwrite prohibition storage area MA1 on the overwrite prohibition EEPROM 132a1 is set in "1" showing that the first initial abnormality analysis data is stored, and when the initial data discriminating flag FTA is reset to "0", determines that the first initial abnormality analysis data is not stored in the overwrite storage area MA1, and proceeds to step S703.

In this step S703, the processing writes the time sequential data of the main torque detection value Tm and sub torque detection value Ts stored in the RAM 131 in the overwrite prohibition storage area MA1, and then, proceeds to step S704, and erases the time sequential data stored in the RAM 131, and then, proceeds to step S705, and after setting the initial data discriminating flag FTA in "1", proceeds to the step S45.

Further, when the determining result of the step S702 shows that the initial data discriminating flag FTA is set in "1", the processing proceeds to step S706, and stores the time sequential data of the main torque detection value Tm and the sub torque detection value Ts stored in the RAM 131 in the overwrite allowable storage area MA2 formed in the overwrite allowable EEPROM 132a2, and after that, proceeds to step S707, and erases the time sequential data stored in the RAM 131, and then, proceeds to the step S45.

Further, in the abnormality detection storage processing of step S73 of FIG. 8, the same processing as those of steps S691 to S707 is also performed for the battery voltage Vb, and the battery voltage Vb is stored during the detection period and the definite period, and the time sequential data is stored in the RAM 131, and when the battery voltage abnormality becomes definite, the time sequential data of the battery voltage stored in the RAM 131 is stored in the overwrite prohibition EEPROM 132a1 or the overwrite allowable EEPROM 132a2 according to the state of the initial data discriminating flag FTA.

Further, the full-time abnormality detection processing, as shown in FIG. 10, first, at step S81, performs verification of writing and reading at the writing time of the EEPROMs 132a1 to 132b2, and by detecting whether or not both of writing and reading are matched and normal, determines whether or not the EEPROMs 132a1 to 132b2 are normal, and when any of the EEPROMs 132a1 to 132b2 are abnormal, proceeds to step S82, and determines whether or not an initial data discriminating flag FTB is set in "1", and when this flag is set to "0", proceeds to step S83, and determines whether or not the abnormal EEPROM is the full-time abnormality overwrite prohibition EEPROM 132b1, and when the full-time abnormality overwrite prohibition EEPROM 132b1 is normal, proceeds to step S85, and after storing the EEPROM abnormality command showing that any of the abnormal EEPROMs 132a2, 132b1 and 132b2 is abnormal in the full-time abnormality overwrite prohibition EEPROM 132b1, proceeds to step S85, and after setting the initial data discriminating flag FTB in "1", terminates the timer interrupt processing, and returns to the predetermined main program, and when the full-time abnormality overwrite prohibition EEPROM 132b1 is abnormal, proceeds to step S86, and stores the EEPROM abnormality command showing that the full-time abnormality overwrite prohibition EEPROM 132b1 is abnormal in the full-time abnormality overwrite allowable EEPROM 132b2, and then, proceeds to step S87, and after outputting an abnormality alarm signal to the alarm circuit 133, terminates the timer interrupt processing, and returns to the predetermined program.

Further, when the determining result of step S82 shows that the initial data discriminating flag FTB is set in "1", the processing proceeds to step S88, and determines whether or not the abnormal EEPROM is the full-time abnormality overtime allowable EEPROM 132b2, and when the abnormal EEPROM is not the full-time abnormality overtime allowable EEPROM 132b2, proceeds to step S89, and after storing the EEPROM abnormality command showing the abnormal EEPROM in the full-time abnormality overwrite allowable EEPROM 132b2, terminates the timer interrupt processing and returns to the predetermined main program, and when the full-time abnormality overwrite allowable EEPROM 132b2 is abnormal, proceeds to step S90, and after storing the EEPROM abnormality command showing the abnormality of the full-time abnormality overwrite allowable EEPROM 132b2 in the initial abnormality overwrite allowable EEPROM 132a2, proceeds to step S91, and outputs the abnormality alarm signal to the alarm circuit 133, and then, terminates the timer interrupt processing and returns to the predetermined main program.

On the other hand, the determining result of step S81 shows that the EEPROMs 132a1 to 132b1 are normal, proceeds to step S92, and by determining whether or not the self watch dog timer 101m has a clear command not generated within the predetermine time and stops working because time is up, determines whether or not the main MCU 101 is normal, and when the main MCU 101 is abnormal, proceeds to step S93, and performs the same processing as the processings of the steps S42 to S44 and S46 in the initial abnormality detection processing shown in FIG. 8, and after executing the abnormality storing processing for storing a main MCU abnormality command showing that the main MCU 101 is abnormal to the full-time overwrite prohibition EEPROM 132b1 or the full-time overwrite allowable EEPROM 132b2 according to the state of the initial data discriminating flag FTB, terminates the timer interrupt processing and returns to the predetermined main program.

Further, when the determining result of the step S92 shows that the main MCU 101 is normal, the processing proceeds to step S94, and by determining whether or not the sub watch dog timer 101s has a clear command not generated by the sub MCU 102 within the predetermined time and stops working because time is up, determines whether or not the sub MCU 102 is normal, and when the sub MCU 102 is abnormal, proceeds to step S103, and performs the same processing as the processings of the steps S42 to S44 and S46 of FIG. 8, and after executing an abnormality storage processing for storing a sub MCU abnormality command showing that the sub MCU 102 is abnormal in the full-time overwrite prohibition EEPROM 132b1 or the full-time overwrite allowable EEPROM 132b2 according to the state of the initial data discriminating flag FTB, terminates the timer interrupt processing and returns to the predetermined main program.

Further, when the determining result at the step S94 shows that the sub MCU 102 is normal, the processing proceeds to step S96, and by determining whether or not the steering assist compensation values IM*' calculated by the main MCU 101 and the sub MCU 102 are approximately matched, determines whether or not the command value calculations of both the main MCU 101 and the sub MCU 102 are normal, and when both of the steering assist compensation values IM*' differ more than the predetermined value, determines that the command value calculation of the main MCU 101 is abnormal, thereby to proceed to step S97, and performs the same processing as the processings of the steps S42 to S44 and S46 of FIG. 8, and after executing the abnormality storing processing for storing a main MCU command value calculation abnormality command showing that the command value calculation of the main MCU 101 is abnormal in the full-time overwrite prohibition EEPROM 132b1 or the full-time overwrite allowable EEPROM 132b2 according to the state of the initial data discriminating flag FTB, terminates the timer interrupt processing and returns to the predetermined main program.

Further, when the determining result at the step S96 shows that the command value calculation is normal, the processing proceeds to step S98, and by determining whether or not the motor current IMD detected by the motor current detection circuit 112 continues a predetermined value abnormality for a predetermined time, determines whether or not the motor current IMD is normal, and when the motor current IMD is an excess current abnormality, proceeds to step S99, and performs the same processing as the processings of the steps S42 to S44 and S46 of FIG. 8, and after executing the abnormality storing processing for storing the value of the abnormal motor current IMD in the full-time overwrite prohibition EEPROM 132b1 or the full-time overwrite allowable EEPROM 132b2 according to the state of the initial data discriminating flag FTB, terminates the timer interrupt processing and returns to the predetermined main program.

Further, when the determining result of the step S98 shows that the motor current IMD is normal, the processing proceeds to step S100, and determines whether or not a motor control system in which a driving power supply abnormality of the motor driving circuit 110, a motor neutral point abnormality, a position signal detection power supply abnormality, a position detection hole IC abnormality, and the like are not generated is normal, and when an abnormality is generated in the motor control system, proceeds to step S101, and performs the same processing as the processings of the steps S42 to S44 and S46 of FIG. 8, and after executing the abnormality storing processing for storing the abnormality command showing the cause of the abnormality in the full-time overwrite prohibition EEPROM 132b1 or the full-time overwrite allowable EEPROM 132b2 according to the state of the initial data discriminating flag FTB, terminates the timer interrupt processing and returns to the predetermined main program.

Furthermore, when the determining result of step S100 shows that the motor control system is normal, the processing proceeds to step S102, and determines whether or not MCU vicinity temperature detected by the temperature sensor 114 is within the range of the normal temperature set in advance and is normal, and when the MCU vicinity temperature is outside of the normal temperature, proceeds to step S103, and performs the same processing as the processings of the steps S42 to S44 and S46 of FIG. 8, and after executing the abnormality storing processing for storing the detected temperature of the temperature sensor 114 in the full-time overwrite prohibition EEPROM 132b1 or the full-time overwrite allowable EEPROM 132b2 according to the state of the initial data discriminating flag FTB, terminates the timer interrupt processing and returns to the predetermined main program.

Further, when the determining result of the step 102 shows that the MCU vicinity temperature is within the range of the normal temperature and is normal, the processing proceeds to step S104, and after reading the torque detection values Tm and Ts of the main torque sensor 3m and the sub torque sensor 3s, and the voltage abnormality detection signal SA outputted from the sensor voltage monitoring unit 3w, proceeds to step S105.

In this step S105, the processing determines whether or not the main torque detection value Tm detected by the main torque sensor 3m is within the normal range of the upper limit value Tmsu to the lower limit value Tmsl which are set in advance, and when the value Tm is outside of the normal range, proceeds to step S106, and similarly to the abnormality detection storing processing of FIG. 9, sets the detection period and definite period, and stores the main torque detection value Tm in the RAM 131 as the time sequential data, and further, replaces the flag FT in course of the torque abnormality detection by a flag FTm in course of the torque abnormality detection, and after performing the abnormality detection storing processing for replacing the initial data discriminating flag FTA by the initial data discriminating flag FTB, terminates the timer interrupt processing and returns to the main program.

Further, when the determining result of step S105 shows that the main torque sensor 3m is normal, the processing proceeds to step S107, and resets the flag FTm in course of the torque abnormality detection to "0", and then, proceeds to step S108, and after erasing the time sequential data stored in the RAM 131, proceeds to step S109.

In this step 109, the processing determines whether or not the main torque detection value Ts detected by the sub torque sensor 3s is within the normal range of the upper limit value Tssu to the lower limit value Tssl which are set in advance, and when the value Ts is outside of the normal range, proceeds to step S110, and similarly to the abnormality detection storing processing of FIG. 9, sets the detection period and definite period, and stores the sub torque detection value Ts in the RAM 131 as the time sequential data, and further, replaces the flag FT in course of the torque abnormality detection by a flag FTs in course of the torque abnormality detection, and after performing the abnormality detection storing processing for replacing the initial data discriminating flag FTA by the initial data discriminating flag FTB, terminates the timer interrupt processing and returns to the main program.

Further, when the determining result of step S109 shows that the sub torque sensor 3s is normal, the processing proceeds to step S111, and resets the flag FTs in course of the torque abnormality detection to "0", and then, proceeds to step S112, and after erasing the time sequential data stored in the RAM 131, proceeds to step S113.

In this step S113, the processing performs the calculation of the formula (1) based on the torque detection values Tm and Ts, thereby to calculate the torque deviation $\Delta T$, and then, proceeds to step S114, and determines whether or not the calculated torque deviation $\Delta T$ is in a normal state below the setting value $\Delta Ts$ set in advance, and when $\Delta T > \Delta Ts$ and in an abnormal state, proceeds to step S115, and sets the same detection period and definite period as the abnormality detection storing processing of FIG. 9, and after performing the torque sensor abnormality detection storing processing for replacing the initial data discriminating flag FTA by the initial data discriminating flag FTB, terminates the timer interrupt processing and returns to the predetermined main program, and when $\Delta T \leq \Delta Ts$ and in an normal state, proceeds to step S116, and resets the flag FT in course of the torque abnormality detection to "0", and then proceeds to step S117, and after erasing the time sequential data stored in the RAM 131, proceed to step S118 to be described later.

In this step S118, the processing reads the voltage abnormality detection signal SA inputted from the torque sensor power supply monitoring unit 3w, and determine whether or not this signal is a theoretical value "0" and normal, and when the voltage abnormality detection signal SA is a theoretical value "1", proceeds to step S119, and performs the same processing as the processings of the steps S42 to S44 and S46 of FIG. 8, and after executing the abnormality storing processing for storing the torque sensor power supply abnormality command showing that the torque sensor power supply is abnormal in the full-time overwrite prohibition EEPROM 132b1 or the full-time overwrite allowable EEPROM 132b2 according to the state of the initial data discriminating flag FTB, terminates the timer interrupt processing and returns to the predetermined main program.

Further, when the determining result of the step S118 shows that the torque sensor power supply is normal, the processing proceeds to step S120, and determines whether or not the battery voltage Vb does not continue for a predetermined time outside of the normal voltage range set in advance and is normal, and when the battery voltage Vb is abnormal, performs the same processing as the processings of the steps S42 to S44 and S46 of FIG. 8, and after executing the abnormality storing processing for storing the battery voltage Vb in the full-time overwrite prohibition EEPROM 132b1 or the full-time overwrite allowable EEPROM 132b2 according to the sate of the initial data discriminating flag FTB, terminates the timer interrupt processing and returns to the predetermined main program.

Furthermore, when the determining result of step S120 shows that the battery voltage Vb is normal, the processing proceeds to step S122, and by determining whether or not a speed abnormality signal is inputted from the speed sensor 17, determine whether or not speed sensor 17 is normal, and when the speed sensor 17 is abnormal, proceeds to step S123, and after performing the abnormality detection storing processing to perform the same processing as the processings of the steps S691 to S699 of FIG. 9 in which the definite period set to 100 ms in sampling cycle and 60 sec in detection period is omitted, terminates the timer interrupt processing and returns to the predetermined main program.

Incidentally, in the full-time abnormality detection processing, when the abnormality detection storing processing is performed, in order to make subsequent abnormality analysis easy, as time sequential data, the main torque detection value Tm, the sub torque detection value Ts, the motor driving signal IM, and the speed detection value T are stored as a set.

In the processings of FIG. 5 and FIGS. 7 to 10, the steering assist control mechanism is constituted by the processing of FIG. 5 and the steering assist mechanism 10, and the processings of FIGS. 7 to 10 correspond to the abnormality detection means of S41, S47, S58, S60, S62, S64 to S66, S70, S72, S81, S92, S94, S96, S98, S100, S102, S104, S105, S109, S112, S114, S118, S120, and S122, and the steps S42 to S44, S48 to S57, S59, S61, S63 to S65, S67 to S69, S71, and S73, the processings of FIG. 9, and the processings of S82 to S91, S93, S95, S97, S99, S101, S106 to S108, S110 to S112, S115, S119, S121, and S123 correspond to the abnormality data storage means.

Next, the operation of the aforementioned embodiment will be described.

Now, at the shipment stage after having completed the fitting of the controller of the electric power steering apparatus at a manufacturing plant, the initial abnormality overwrite prohibition EEPROM 132$a$1, the initial abnormality overwrite allowable EEPROM 132$a$2, and the full-time abnormality overwrite prohibition EEPROM 132$b$1 and the full-time abnormality overwrite allowable EEPROM 132$b$2 constituting EEPROM 132 are totally not recorded with the abnormality analysis data and put into a clear state, and at the same time, various flags such as the abnormality state flag AF, the initial data discriminating flags FTA and FTB, the flag FT in course of the abnormality detection, the period state flag FS, and the like are all reset to "0".

In order to start using the vehicle from this shipment state, a key switch is put into an ON state, so that the power supply is put into the controller 14, and the processings of FIG. 5 and FIGS. 7 to 9 are executed and started by the main MCU 101, and at the same time, the processing of FIG. 5 is executed and started by the sub MCU 102. At this time, in the main MCU 101, when an ignition switch is put into an ON state, at the inputting time of the power supply, first, the initial abnormality detection processing shown in FIG. 8 is executed, it is determined whether or not the RAM 131, the EEPROMs 132$a$1 and 132$a$2, and 132$b$1 and 132$b$2, the main MCU 101, and the sub MCU 102 are normal, and at the same time, the initial diagnosis is made as to whether or not the MCU vicinity temperature is normal and the torque sensor 3$m$ is normal, and when each unit is normal by this diagnosis, the steering assist control processing of FIG. 5 and the full-time abnormality detecting processing of FIG. 10 are executed.

In the steering assist control processing of FIG. 5, a neutral voltage V0 is subtracted from the torque detection value T detected by the steering torque sensor 3, thereby to calculate the steering torque Ts (step S2), and then, the speed detection value V is read from the speed sensor 17 (step S3), and based on the steering torque Ts and the speed detection value V, the steering assist command value IM* is calculated by referring to the steering assist command value calculation map shown in FIG. 6 (step S4).

On the other hand, the processing reads the motor angular speed ω presumed by the motor angular speed estimation circuit 20 (step S5), and based on this motor angular speed ω, calculates the inertia compensation value Ii for inertia compensation control, and calculates the friction compensation value If for friction compensation control (step S6), and further, differentially calculates the steering torque Ts, thereby to calculate the center response improvement command value Ir (step S7), and adds these inertia compensation value Ii, the friction compensation value If, and the center response improvement compensation value Ir to the steering assist command value IM* and calculates the steering assist compensation value IM*' (step S8).

The processing subjects the steering assist compensation value IM*' to differential calculation processing so as to calculate the differential value Id for differential compensation control in the feed forward control (step S9), and then, subtracts the motor current compensation value IMA, thereby to calculate the current deviation ΔI (step S10), and subjects the calculated current deviation ΔI to comparison calculation processing so as to calculate the comparison value ΔIp for comparison compensation control, and performs integral calculation processing so as to calculate an integral value ΔIi for integral compensation control (steps S11 and S12), and then, adds the integral value Id, the comparison value ΔIp, and the integral value ΔIi, thereby to calculate the motor driving signal IM (step S13).

At this time, in the abnormality detection processing of FIG. 7, assume that the abnormality is not detected in the steering assist control system and the abnormality state flag AF is reset to "0", the processing proceeds to step S16, and by outputting the calculated motor driving signal IM to the motor driving circuit 110, supplies the driving current to the electric motor 13 from the motor driving circuit 110, and allows the steering assist force corresponding to the steering torque operated on the steering wheel 1 by this electric motor 13 to be generated, and output this steering assist force to the output shaft 2$b$ through the reduction gear 11.

At this time, in a so-called steering state without driving while a vehicle is in a parking state, since the inclination of the characteristic line of the steering assist command value calculation map shown in FIG. 6 is sharp, so that a large steering assist command value IM* is calculated by a small steering torque Ts, and thus, a large steering assist force is generated by the electric motor 13, thereby enabling to perform light steering.

On the other hand, when the vehicle starts moving and exceeds a predetermined speed, the inclination of the characteristic line of the steering assist command value calculation map of FIG. 6 becomes small, so that a small steering assist command value IM* is calculated even by a large steering torque Ts, and thus, the steering assist force generated by the electric motor 13 becomes small, thereby enabling to perform an optimum steering by preventing the steering of the steering wheel 1 from becoming too light.

On the other hand, in the full-time abnormality detection processing of FIG. 10, since the full-time abnormality detection processing is executed as a timer interrupt processing for every predetermined time, the processing determines in full-time whether or not the EEPROMs 132$a$1 to 132$b$2, the main MCU 101, and the sub MCU 102 are normal, and at the same time, always determines whether or not the command value calculation by the main MCU 101 is normal, the motor current IM is normal, the motor control system is normal, the MCU vicinity temperature is normal, the torques sensor 3$m$ is normal, the battery voltage Vb is normal, and the speed sensor 17 is normal.

In case the abnormality is not detected by the full-time abnormality detection processing, the steering assist control processing of FIG. 5 is continuously executed.

From this normal state of the steering assist control mechanism, for example, a short-circuit, a disconnection, and the like are generated in the main torque sensor 3m of the steering torque sensor 3, and when the steering torque detection value T is put into a state deviating outside of the normal range, in the processing of FIG. 10, the processing proceeds to step S106 from step S105, and executes the same processings as FIG. 9, and then, the main torque detection value Tm, the sub torque detection value Ts, the motor current IM, and the speed V are stored in the RAM 131 as time sequential data within the detection period of the predetermined time by a predetermined sampling cycle, and after that, within the definite period of the predetermined time, similarly, the main torque detection value Tm, the sub torque detection value Ts, the motor current IM, and the speed V are stored in the RAM 131 as time sequential data by a predetermined sampling cycle.

When the definite period is over and if it is a first-time abnormality, since the initial data discriminating flag FTB is reset to "0", the time sequential data is stored in the full-time abnormality overwrite prohibition EEPROM 132b1 as shown in FIG. 4, and when a self abnormality or another abnormality is generated at the beginning and the initial data discriminating flag FTB is set in "1", the time sequential data is stored in the full-time abnormality overwrite allowable EEPROM 132b.

Similarly, during the execution of the full-time abnormality detection processing, when the abnormality outside of the normal range is generated in the sub torque sensor 3s or an abnormality in which the deviation ΔT of the main torque detection value Tm and the sub torque detection value Ts exceeds the predetermined value ΔTs, the abnormality detection storing processing of FIG. 9 is performed, similarly to the aforementioned, thereby storing the time sequential data of the detection period and the definite period in the full-time abnormality overwrite prohibition EEPROM 132b1 or the full-time abnormality overwrite allowable EEPROM 132b according to the state of the initial data discriminating flag FTB.

On the other hand, during the full-time abnormality detection processing, when an abnormality is generated in the main MCU 101, the sub MCU 102, the command value calculation of the main MCU 101, the motor current IM, the motor control system, the MCU vicinity temperature, and the battery voltage Vb, at the point of time when the abnormality is generated, the abnormality command showing the abnormality generated according to the state of the initial data discriminating flag FTB is stored in the full-time abnormality overwrite prohibition EEPROM 132a1 or the full-time abnormality overwrite allowable EEPROM 132b2.

In this way, in the full-time abnormality detection processing, the abnormality generated at the beginning after the shipment is stored by any of the time sequential data, the abnormality command, and the abnormality detection value in the full-time abnormality overwrite prohibition EEPROM 132b1, and since the subsequent overwrite is prohibited, a first abnormality generated in the operating state of the steering assist controller is reliably retained, and the abnormality generated subsequently is overwritten and stored in the overwrite allowable EEPROM 132b2.

Hence, in case the analysis is performed when the abnormality is generated in the steering assist controller, by reading the abnormality analysis data stored in the EEPROMs 132b1 and 132b2, it is possible to reliably grasp what has caused the generation of the first abnormality, and though the subsequent abnormalities are overwritten and stored, it is possible to grasp whether or not other abnormalities are generated.

Similarly, in the initial abnormality detection processing of FIG. 8, when the abnormality is generated at the beginning, any one of the time sequential data, the abnormality command, and the abnormality detection value is stored in the initial abnormality overwrite prohibition EEPROM 132a1, and when the abnormality subsequent to the second time is generated, the subsequent abnormality is overwritten and stored in the initial abnormality overwrite allowable EEPROM 132a2.

Hence, the abnormality generated in the initial state in which the power supply is inputted to the steering controller can be reliably stored in the initial abnormality overwrite prohibition EEPROM 132a1 and the initial abnormality overwrite allowable EEPROM 132a2, and thus, the abnormality analysis can be accurately performed.

In this way, according to the foregoing embodiment, when the abnormality is detected by two abnormality detection processings of the initial abnormality detection processing and the full-time abnormality detection processing, any one of the time sequential data, the abnormality command, and the abnormality detection value is stored individually in the overwrite prohibition EEPROMs 132a1 and 132a2, and 132b1 and 132b2, and it is, therefore, possible to accurately grasp whether the abnormality of the steering assist controller is generated in the initial state or in the subsequent operating state of the steering assist device, and thus, the abnormality analysis can be much accurately performed.

Furthermore, when the user detects an abnormality of the steering assist control mechanism and requests the dealer and the like to repair the abnormality, in case the abnormality is generated again when confirming the abnormality by activating the steering assist control processing again at a repair facility, the abnormality analysis data collected at this time is overwritten and stored in the overwrite allowable EEPROMs 132a2 or 132b2, and the initial abnormality analysis data stored in the overwrite prohibition EEPROMs 132a1 and 132b1 is not overwritten and can be reliably retained.

Incidentally, in the foregoing embodiment, though a description has been made on the case where the overwrite prohibition EEPROMs 132a1 and 132b1 and the overwrite allowable EEPROMs 132a2 and 132b2 are provided one each, respectively, the case is not limit to this, and each of the EEPROMs 132a1, 132a2, 132b1 and 132b2 may be provided in a plurality, respectively or this may be not limited to the case where each of the EEPROMs 132a1, 132a2, 132b1, and 132b2 is provided in the same number, but each EEPROM may be provided individually in the arbitrary number.

Furthermore, in the foregoing embodiment, though a description has been made on the case where the overwrite prohibition EEPROM 132a1 and 132b1 are totally prohibited from being overwritten, the case is not limited to this, and in case the abnormality command other than the time sequential data or the abnormality detection value is stored, since the data amount thereof is few, an overwrite data management unit for accumulating the overwrite data amount in a nonvolatile memory is provided, and by this overwrite data management unit, memory can be continued during a period until the memory amount of the overwrite prohibition EEPROMs 132a1 and 132b1 becomes maximum.

Figure 11:
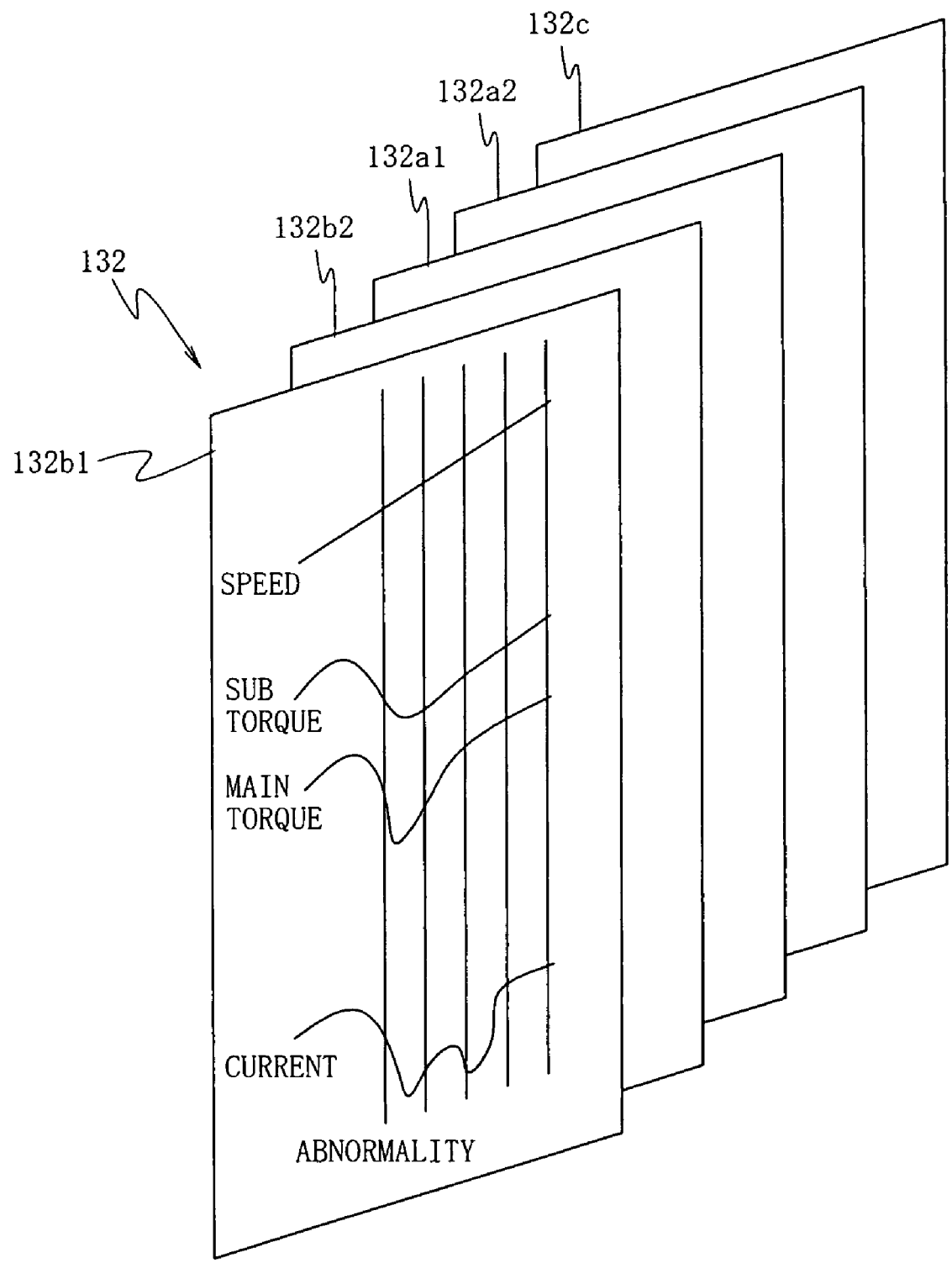
FIG. 11 is another explanatory drawing showing a structure of EEPROM.

That is, as shown in FIG. 11, a data management EEPROM 132c is newly provided in the main MCU 101, and as shown in FIG. 12, a data write management processing for managing the data amount stored in the overwrite prohibition EEPROMs 132a1 and 132b1 is executed by the main MCU 101. This data write management processing is executed as a timer interrupt processing for every predetermined time (for example, 2 msec), and first, at step S201, determines whether or not it is in a state of data write to the overwrite prohibition EEPROMs 132a1 and 132b1, and when it is not in a state of data write to the overwrite prohibition EEPROMs 132a1 and 132b1, terminates the timer interrupt processing as it is, and returns to the predetermined main program. When the determining result of step S201 shows that it is in a state of data write to the overwrite prohibition EEPROMs 132a1 and 132b1, the processing proceeds to step S202, and determines whether or not a write object is the overwrite prohibition EEPROM 132a1, and when the write object is the overwrite prohibition EEPROM 132a1, proceeds to step S203, and determines whether or not the initial data discriminating flag FTA is "1", and when this initial data discriminating flag FTA is "0", proceeds to step S204, and reads a data amount Da1 stored in the data mount storage area for the EEPROM 132a1 of the data management EEPROM newly provided, and then, proceeds to step S205, and adds a data amount da newly written from now to the read data amount Da1, thereby to calculate a new data amount Da1 (=Da1+da).

Next, the processing proceeds to step S206, and determines whether or not the calculated data amount Da1 has reached an allowable data amount Das of the overwrite prohibition EEPROM 132a1, and when Da1≦Das, proceeds to step S207, and after writing the new abnormality data in the overwrite prohibition EEPROM 132a1, terminates the timer interrupt processing and returns to the predetermined main program.

On the other hand, when the determining result of step S206 shows that Da1>Das, the processing proceeds to step S208, and after setting the initial data discriminating flag FTA in "1", proceeds to step S209, and after writing the new abnormality data in the overwrite allowable EEROM 132a2, terminates the timer interrupt processing and returns to the predetermined main program.

Further, when the determining result of the step S203 shows that the initial data discriminating flag FTA is "1", the processing proceeds directly to step S209.

Further, when the determining result of the step S202 shows that the write object is the overwrite prohibition EEPROM 132b1, the processing proceeds to step S210, and determines whether or not the initial data discriminating flag FTB is "1", and when this initial data discriminating flag FTB is "0", proceeds to step S211, reads a data amount Db1 stored in the data amount storage area for the EEPROM 132b1 of the data management EEPROM newly provided, and then, proceeds to step S212, and adds a data amount db written from now to the read data amount Db1, thereby to calculate a new data amount Db1 (=Db1+db).

Subsequently, the processing proceeds to step S213, and determines whether or not the calculated data amount Db1 has reached an allowable data amount Dbs of the overwrite prohibition EEPROM 132b1, and when Db1≦Dbs, proceeds to step S214, and after writing the new abnormality data in the overwrite prohibition EEPROM132b1, terminates the timer interrupt processing and returns to the predetermined main program.

On the other hand, when the determining result of step S213 shows that Db1>Dbs, the processing proceeds to step S215, and after setting the initial data discriminating flag FTB in "1", proceeds to step S216, and after writing the new abnormality data in the overwrite allowable EEPROM 132b2, terminates the timer interrupt processing and returns to the predetermined main program.

Further, when the determining result of the step S210 shows that the initial data discriminating flag FTB is "1", the processing proceeds directly to step S216.

In this manner, in case the management of the initial data discriminating flags FTA and FTB by the data write management processing generates a vacancy in storage capacity of the overwrite prohibition EEPROMs 132a1 and 132b1, the abnormality data is written in order in these overwrite prohibition EEPROMs 132a1 and 132b1, and by writing the abnormality data in the overwrite allowable EEPROMs 132a2 and 132b2 in a state in which the overwrite prohibition EEPROMs 132a1 and 132b1 are fully occupied, a large number of abnormality data can be saved without overwriting. In this case, the time sequential data storage area for storing the aforementioned time sequential data which is important as analysis data is secured in the overwrite prohibition EEPROMs 132a1 and 132b1, and this time sequential data storage area is prohibited from being written with other abnormality data, and other abnormality data can be stored in the storage area other than the time sequential data storage area until its storage capacity is fully occupied. For this purpose, by determining whether or not the data written in the overwrite prohibition EEPROMs 132a1 and 132b1 is a time sequential data, and determining whether or not an initial time sequential data is stored in the time sequential data storage area, when it is a time sequential data, the initial time sequential data is stored in the time sequential data storage area, and when it is the next time sequential data, it may be decided whether or not the data is stored according to the remaining capacity of other storage area.

In this case, when the abnormality other than the abnormality including the time sequential data is generated, a plurality of abnormalities can be stored in the overwrite prohibition EEPROMs 132a1 and 132b1, and the abnormality analysis when a complex abnormality is generated can be much accurately performed.

Figure 13:
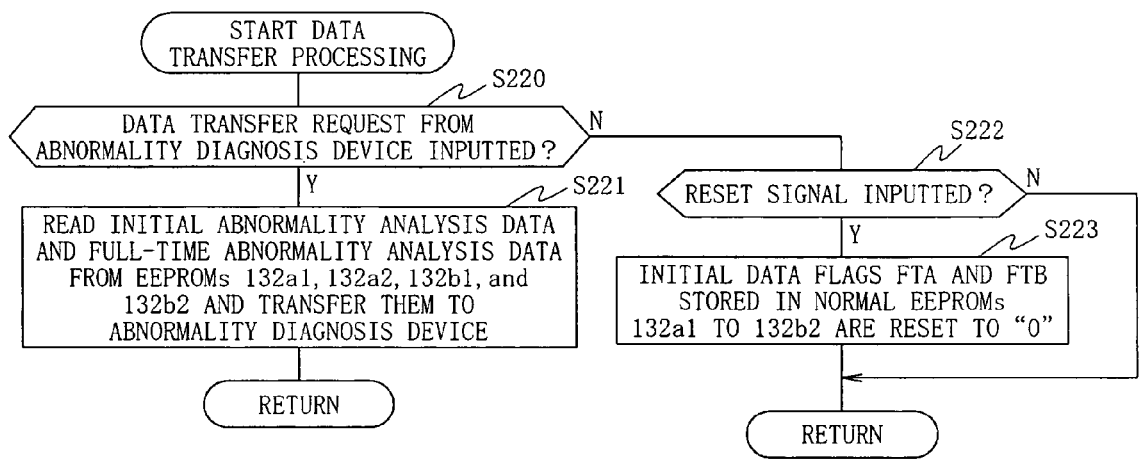
FIG. 13 is a flowchart showing one example of the data transfer processing procedure executed by the main MCU.

Further, as shown in FIG. 3, at a repair facility, an abnormality diagnosis device 29 is connected to the main MCU 101, and a data transfer processing as shown in FIG. 13 is performed by the main MCU 101, thereby to read the initial abnormality analysis data and the full-time abnormality analysis data stored in the overwrite prohibition EEPROMs 132a1 and 132b1 and the overwrite allowable EEPROMs 132a2 and 132b2, so that an accurate abnormality analysis can be performed. Upon termination of this abnormality analysis, a reset signal for resetting the initial data discriminating flags FTA and FTB to "0" from the abnormality diagnosis device 29 is inputted into the main MCU 101, so that the writing of the initial abnormality analysis data into the overwrite prohibition EEPROMs 132a1 and 132b1 can be made.

Here, the data transfer processing, as shown in FIG. 13, is executed as a timer interrupt processing for every predetermined time (for example, 2 msec) when the abnormality diagnosis device 29 is connected to the main MCU 101, and first at step S220, determines whether or not a data transfer request is inputted from the abnormality diagnosis device 29, and when the data transfer request is inputted, proceeds to step S221, and reads the initial abnormality analysis data and the full-time abnormality analysis data stored in the overwrite prohibition EEPROMs 132a1 and 132b1 and the overwrite allowable EEPROMs 132a2 and 132b2, and after transferring them to the abnormality diagnosis device 29, terminates the timer interrupt processing.

Further, when the determining result of the step S220 shows that the data transfer request is not inputted, the processing proceeds to step S222, and determines whether or not a reset signal is inputted, and when the reset signal is not inputted, terminates the timer interrupt processing as it is, and when the reset signal is inputted, proceeds to step S223, and after resetting the initial data discriminating flags FTA and FTB stored in the normal EEPROMs 132a1 to 132b2 to "0", terminates the timer interrupt processing and returns to the predetermined main program.

In the data transfer processing of this FIG. 13, the processings of steps S222 and S223 correspond to flag reset means.

Further, the EEPROMs 132a to 132b are made detachable attachable, and after removing these EEPROMs and installing them in the abnormality diagnosis device 29, the abnormality analysis is performed, and the resetting of flags FTA and FTB may be performed. In this case, the abnormality diagnosis device 29 corresponds to flag reset means.

Furthermore, in the foregoing embodiment, though a description has been made on the case where the motor driving current IM is calculated by software processing executed by a central processor 32, the case is not limited to this, and by hardware combining a steering assist command value computing unit, a center response improvement circuit, an inertia compensator, a friction compensator, a differential compensator, a subtracter, a comparison compensator, an integral computing unit, an adder and the like, the motor driving current IM may be calculated.

Furthermore, in the foregoing embodiment, though a description has been made on the case where the EEPROMs are adopted as storage means, the case is not limited to this, and an arbitrary nonvolatile memory such as a flash memory and the like may be adopted. Further, the type of the time sequential data written in the EEPROMs can be sets arbitrarily according to the abnormality generated.

Further, when the abnormality affecting the normal operation of the electric power steering apparatus is detected by the initial abnormality detection processing and the full-time abnormality detection processing in the main MCU 101, the steering assist control processing of FIG. 5 may be terminated.

Further, in the foregoing embodiment, though a description has been made on the case where the initial abnormality detection processing and the full-time abnormality detection processing are performed only by the main MCU 101, the case is not limited to this, and even by the sub MCU 102, the EEPROMs are provided, so that the initial abnormality detection processing and the full-time abnormality detection processing may be performed.

What is claimed is:

1. A controller of an electric power steering apparatus, comprising:
    a steering assist control mechanism comprising an electric motor giving a steering assist force to a steering system;
    abnormality detection means for detecting an abnormality of the steering assist control mechanism; and
    abnormality data storage means for storing abnormality analysis data for analyzing the abnormality in the storage means when the abnormality of the steering assist control mechanism is detected by the abnormality detection means,
    wherein said storage means comprises an overwrite prohibition storage area for prohibiting an overwrite of said abnormality analysis data and an overwrite allowable storage area for overwriting and storing said abnormality analysis data, and
    wherein said abnormality data storage means is constituted to store an abnormality of the steering assist control mechanism detected by the abnormality detection means in said overwrite prohibition storage area when the abnormality is a first abnormality analysis data, and store the abnormality in said overwrite allowable storage area when the abnormality is the abnormality analysis data subsequent to the second time.

2. The controller of the electric power steering apparatus according to claim 1, wherein said storage means is constituted by an electrically erasable read-only memory.

3. The controller of the electric power steering apparatus according to claim 1, wherein said abnormality data storage means is constituted to have an initial data discriminating flag set when an initial abnormality analysis data is stored in said storage means, and store the abnormality analysis data as the initial abnormality analysis data in said overwrite prohibition storage area in case said abnormality analysis data is inputted when the initial data discriminating flag is reset, and store the abnormality analysis data in said overwrite allowable storage area as the abnormality analysis data subsequent to the initial abnormality analysis data when the initial data discriminating flag is set.

4. The controller of the electric power steering apparatus according to claim 3, wherein said abnormality data storage means comprises flag reset means for resetting said initial data discriminating flag when an analysis processing of the abnormality analysis data is performed.

5. The controller of the electric power steering apparatus according to claim 1, wherein said storage means has a plurality of overwrite prohibition storage areas.

6. The controller of the electric power steering apparatus according to claim 1, wherein said abnormality data storage means is constituted to retain the abnormality analysis data during a predetermined time before and after the abnormality detection in time sequence.

7. The controller of the electric power steering apparatus according to claim 6, wherein said abnormality analysis data is constituted by the time sequential data of the detection period comprising a first predetermined time leading to the generation of the abnormality and the time sequential data of the confirmation period from the expiry of said detection period to a second predetermined time.

8. The controller of the electric power steering apparatus according to claim 6, wherein said initial abnormality detection means is constituted to perform any one or a plurality of the initial abnormality detection of the toque detection means included in said steering assist control mechanism, the initial abnormality detection of the control means included in said steering assist control mechanism, the initial abnormality detection of the current detection means included in said steering assist control mechanism, the initial abnormality detection of the electric motor included in said steering assist control mechanism, the initial abnormality detection of the power supply system and the initial abnormality detection of said storage means.

9. The controller of the electric power steering apparatus according to claim 2, wherein said storage means has a plurality of overwrite prohibition storage areas.

10. A controller of an electric power steering apparatus, comprising:
    a steering assist control mechanism comprising an electric motor giving a steering assist force to a steering system;

initial abnormality detection means for detecting an abnormality at the operation starting time of the steering assist control mechanism;

full-time abnormality detection means for detecting the abnormality in full time after the operation starting time of said steering control mechanism; and abnormality data storage means for storing the abnormality analysis data for analyzing the abnormality in the storage means when the abnormality is detected by said initial abnormality detection means and said full-time abnormality detection means, wherein said storage means comprises initial abnormality and full-time abnormality overwrite prohibition storage areas for prohibiting the overwrite of said abnormality analysis data and the initial abnormality and full-time abnormality overwrite allowable storage areas for overwriting and storing the abnormality analysis data individually corresponding to said initial abnormality detection means and said full-time abnormality detection means, and wherein the abnormality data storage means is constituted to store an abnormality of the steering assist control mechanism detected by said initial abnormality detection means in said initial abnormality overwrite prohibition storage area when the abnormality is an initial abnormality analysis data, and store the abnormality in said initial abnormality overwrite allowable storage area when the abnormality is the initial abnormality analysis data subsequent to the second time, and store the abnormality in said full-time abnormality overwrite prohibition storage area when the abnormality of the steering assist control mechanism detected by said full-time abnormality detection means is an initial abnormality analysis data, and store the abnormality in said full-time abnormality overwrite allowable storage area when the abnormality is the full-time abnormality analysis data subsequent to the second time.

11. The controller of the electric power steering apparatus according to claim 10, wherein said initial abnormality detection means is constituted to perform any one or a plurality of the initial abnormality detection of the toque detection means included in said steering assist control mechanism, the initial abnormality detection of the control means included in said steering assist control mechanism, the initial abnormality detection of the current detection means included in said steering assist control mechanism, the initial abnormality detection of the electric motor included in said steering assist control mechanism, the initial abnormality detection of the power supply system and the initial abnormality detection of said storage means.

12. The controller of the electric power steering apparatus according to claim 10, wherein said full-time abnormality detection means is constituted to perform any one or a plurality of the full-time abnormality detection of the toque detection means included in said steering assist control mechanism, the fall-time abnormality detection of the control means included in said steering assist control mechanism, the full-time abnormality detection of the current detection means included in said steering assist control mechanism, the full-time abnormality detection of the electric motor included in said steering assist control mechanism, the full-time abnormality detection of the speed detection means included in said steering assist control mechanism and the full-time abnormality detection of the power supply system.

13. The controller of the electric power steering apparatus according to claim 10, comprising data amount managing means for managing the data amount initially stored in said initial abnormality overwrite prohibition storage area and the full-time abnormality overwrite prohibition storage area, and storage data adding means for additionally storing new abnormality analysis data in the initial abnormality overwrite prohibition storage area and the full-time abnormality overwrite prohibition storage area by determining whether or not the abnormality analysis data is storable and if storable based on the data amount managed by said data amount managing means when the abnormality analysis data is generated next.

14. The controller of the electric power steering apparatus according to claim 13, wherein said data managing means is constituted to store and manage the data amount stored in said initial abnormality overwrite prohibition storage area and the full-time abnormality overwrite prohibition storage area in the nonvolatile memory.

15. The controller of the electric power steering apparatus according to claim 10, wherein said abnormality data storage means is constituted to retain the abnormality analysis data during a predetermined time before and after the abnormality detection in time sequence.

16. The controller of the electric power steering apparatus according to claim 15, wherein said abnormality analysis data is constituted by the time sequential data of the detection period comprising a first predetermined time leading to the generation of the abnormality and the time sequential data of the confirmation period from the expiry of said detection period to a second predetermined time.

17. The controller of the electric power steering apparatus according to claim 15, wherein said initial abnormality detection means is constituted to perform any one or a plurality of the initial abnormality detection of the toque detection means included in said steering assist control mechanism, the initial abnormality detection of the control means included in said steering assist control mechanism, the initial abnormality detection of the current detection means included in said steering assist control mechanism, the initial abnormality detection of the electric motor included in said steering assist control mechanism, the initial abnormality detection of the power supply system and the initial abnormality detection of said storage means.

18. The controller of the electric power steering apparatus according to claim 15, wherein said full-time abnormality detection means is constituted to perform any one or a plurality of the full-time abnormality detection of the toque detection means included in said steering assist control mechanism, the full-time abnormality detection of the control means included in said steering assist control mechanism, the full-time abnormality detection of the current detection means included in said steering assist control mechanism, the full-time abnormality detection of the electric motor included in said steering assist control mechanism, the full-time abnormality detection of the speed detection means included in said steering assist control mechanism and the full-time abnormality detection of the power supply system.

* * * * *